(12) United States Patent
Muckerheide et al.

(10) Patent No.: US 6,347,891 B1
(45) Date of Patent: Feb. 19, 2002

(54) ENGRAVING SYSTEM AND METHOD COMPRISING DIFFERENT ENGRAVING DEVICES

(75) Inventors: Donald J. Muckerheide, Dayton; David R. Seitz, Vandalia, both of OH (US)

(73) Assignee: Ohio Electronic Engravers, Inc., Dayton, OH (US)

( * ) Notice: Subject to any disclaimer, the term of this patent is extended or adjusted under 35 U.S.C. 154(b) by 0 days.

(21) Appl. No.: 08/997,942

(22) Filed: Dec. 24, 1997

Related U.S. Application Data

(63) Continuation-in-part of application No. 08/887,179, filed on Jul. 2, 1997, which is a continuation of application No. 08/429,344, filed on Apr. 26, 1995, now Pat. No. 5,663,802.

(51) Int. Cl.7 ................................................. B41C 1/02
(52) U.S. Cl. ...................... 395/104; 358/299; 358/297; 358/296
(58) Field of Search ................................ 358/299, 296, 358/297; 395/104; 400/82; 347/40, 42

(56) References Cited

U.S. PATENT DOCUMENTS

| | | | |
|---|---|---|---|
| 3,280,252 A | 10/1966 | Lilien et al. | 178/6 |
| 3,770,888 A | 11/1973 | de Vos et al. | 178/6.6 |
| 3,784,739 A | 1/1974 | de Vos et al. | 178/6.6 |
| 4,007,362 A | 2/1977 | Sindermann | 235/151 |

(List continued on next page.)

FOREIGN PATENT DOCUMENTS

| | | | |
|---|---|---|---|
| DE | 4243750 | 6/1994 | |
| DE | 4435367 | 3/1995 | |
| EP | 0108162 | 9/1982 | |
| EP | 636475 A1 * | 2/1995 | 358/299 |
| EP | 0644829 | 3/1995 | |
| EP | 0741335 | 11/1996 | |
| EP | 884175 A2 * | 12/1998 | 358/299 |

OTHER PUBLICATIONS

"Digilas System Options for the Future –Laser technique for Flexo and Gravure Printing", Schepers druckformtechnik, Wullner Strasse 60, 48691 Vreden/Germany, undated publication.

"The Digilas Direct–to–Plate system: A New Level of Printing Precision", Napp Advanced printing Products, 260 South Pacific San Marcos, California 92069, undated publication.

(List continued on next page.)

*Primary Examiner*—Edward L. Coles
*Assistant Examiner*—Coulter Henry
(74) *Attorney, Agent, or Firm*—Jacox, Meckstroth & Jenkins

(57) ABSTRACT

This invention relates to an engraving system and method for engraving a pattern using a plurality of engraving devices. The invention discloses apparatus and method for sequencing and engraving a plurality of engraving devices such that when the areas engraved by those heads meet they provide a continuous engraved pattern. The system and method also comprises an imaging system for imaging the engraved areas associated with each engraving head so that the heads or signals driving the heads may be adjusted to further facilitate providing engraved areas which appear as if they had been engraved by a single engraving head when, for example, the engraved area of one head meets the engraved area of another head. Also disclosed is a method for sequencing and transmitting image data associated with an image to be engraved in order to accommodate any cylindrical offset or the angular displacement between, for example, two engraving heads that are positioned in a generally opposed relationship. Finally, a single, multipurpose engraving system and method are shown for both exposing resist on a workpiece and also engraving either the same or a different workpiece.

80 Claims, 14 Drawing Sheets

U.S. PATENT DOCUMENTS

| | | | |
|---|---|---|---|
| 4,079,235 A | 3/1978 | Froyd et al. | 364/107 |
| 4,126,821 A | 11/1978 | Cannon | 318/696 |
| 4,342,052 A | 7/1982 | Rackley et al. | 358/287 |
| 4,347,785 A | 9/1982 | Chase et al. | 101/1 |
| 4,357,633 A | 11/1982 | Buechler | 358/299 |
| 4,450,486 A | 5/1984 | Buechler | 358/299 |
| 4,505,354 A | 3/1985 | George et al. | |
| 4,603,391 A | 7/1986 | Inoue et al. | 364/474 |
| 4,678,976 A | 7/1987 | Inoue | 318/577 |
| 4,683,500 A | 7/1987 | Kitamura et al. | 358/280 |
| 5,164,285 A | 11/1992 | Takakura | 430/307 |
| 5,329,215 A | 7/1994 | Fraser et al. | 318/603 |
| 5,424,845 A | 6/1995 | Holowko et al. | 358/299 |
| 5,440,398 A | 8/1995 | Holowko et al. | 358/299 |
| 5,483,422 A | 1/1996 | Holowko et al. | 358/299 |
| 5,491,559 A | 2/1996 | Buechler | 358/299 |
| 5,492,057 A | 2/1996 | Bornhorst, Jr. | 358/299 |
| 5,654,125 A | 8/1997 | Fan et al. | 430/306 |
| 5,663,802 A | 9/1997 | Beckett et al. | |
| 5,894,354 A * | 4/1999 | Beckett et al. | 358/299 |

OTHER PUBLICATIONS

"Helio Packaging. The reliable digital production line–single repeat, complete forme, forme proof, cylinder engraving", Linotype–Hell, AG, Kiel Plant, Siemenswall, D–24107 Kiel, germany, undated.

"HelioKlischograph K406–The Digital Engraver in the HelioPublication System", Hell Gravure Systems GmbH, D–24107 Kiel, Siemenswall, Germany, undated publication.

"HelioKlischograph K405–The digital engraver for the Heliopackaging System", Hell Gravure Systems GmbH, D–24107 Keil, Siemenswall, Germany, undated publication.

"Gravostar Gravocomplete", Max Daetwyler Corp., Huntersville, North Carolina 28078, undated publication.

"M800 Series engraver", Ohio Electronic Engravers, Inc., 4105 Executive Drive, Dayton, Ohio 45430, Copyright 1996 and 1997, Form No. 9800–5504B.

"DuPont Cyrel Digital Imaging system", Barco Graphics and DuPont Printing & Publishing, undated publication.

OmniSetter, Film/Plate Imaging Technology for offset and flexo from the World Leader in Plate Imaging, Misomex International, 5 Flagstone Drive, Hudson, New Hampshire 03051–4905, undated publication.

Flexosetter 4872, The World's first Dual Film/Plate Imaging Technology for Flexo from the World Leader in Plate Imaging, Misomex North American, Inc., 9590 Berwyn Avenue, Rosemont, Illinois 60018–5227, undated publication.

"Datwyler", MDC Max Daetwyler corp., USA, 13420 West Reese Blvd., Huntersville, NC 28078, undated brochure.

"Polishmaster Junior High Precision Machining and Measuring Center for Rotogravure Cylinders", MDC Max Datwyler AG, CH–3368 Bleienbach/Schweiz, Switzerland, undated brochure.

"Polishmaster High–Precision Machining and Measuring Center for gravure Cylinders", MDC Max Datwyler AG, CH–3368 Bleienbach/Schweiz, undated.

"Finishmaster Unit for Polishing of Rotogravure Cylinders After Copper or Chrome Plating", MDC Max Datwyler AG, CH–3368 Bleienbach/Schweiz, Switzerland, undated brochure.

"Cu–Master Type E Plating Tanks for Copper–Plating of Rotogravure Cylinders", MDC Max Datwyler AG, CH–3368 Bleienbach/Schweiz, Switzerland, undated brochure.

"Cr–Master Type E Plating Tanks for Chrome–plating of Rotogravure Cylinders," MDC Max Datwyler AG, CH–3368 Bleienbach/Schweiz, Switzerland, undated brochure.

"Twin–Pilot", Maschinenfabrik Kaspar Walter GmbH & Co., KG, Plinganserstrasse 22, 8000 Munchen 70, Germany, undated brochure.

JAV, "Getting Better Accuracy with Non–Precision Ball Screws", American Machinist, Feb. 1993, pp. 50–51.

HelioKlischograph K304–for Packaging and Product Gravure Printing, Hell Graphic Systems, Inc., Dr. Ing. Rudolf Hell GmBH, P.O. Box 6229, D–2300 Kiel 14, undated brochure.

"Helio–Klischograph–Precision Engraving in Copper", Hell Graphic Systems, Inc., Dr. Ing. Rudolf Hell GmbH, P.O. Box 6229, D–2300 Kiel 14, undated brochure.

"Helio Klischograph K301 and K302 for Magazine Gravure Printing", Hell Graphic Systems, Inc., Dr. Ing. Rudolf Hell gmbH, P.O. Box 6229, D–2300 Kiel 14, undated brochure.

* cited by examiner

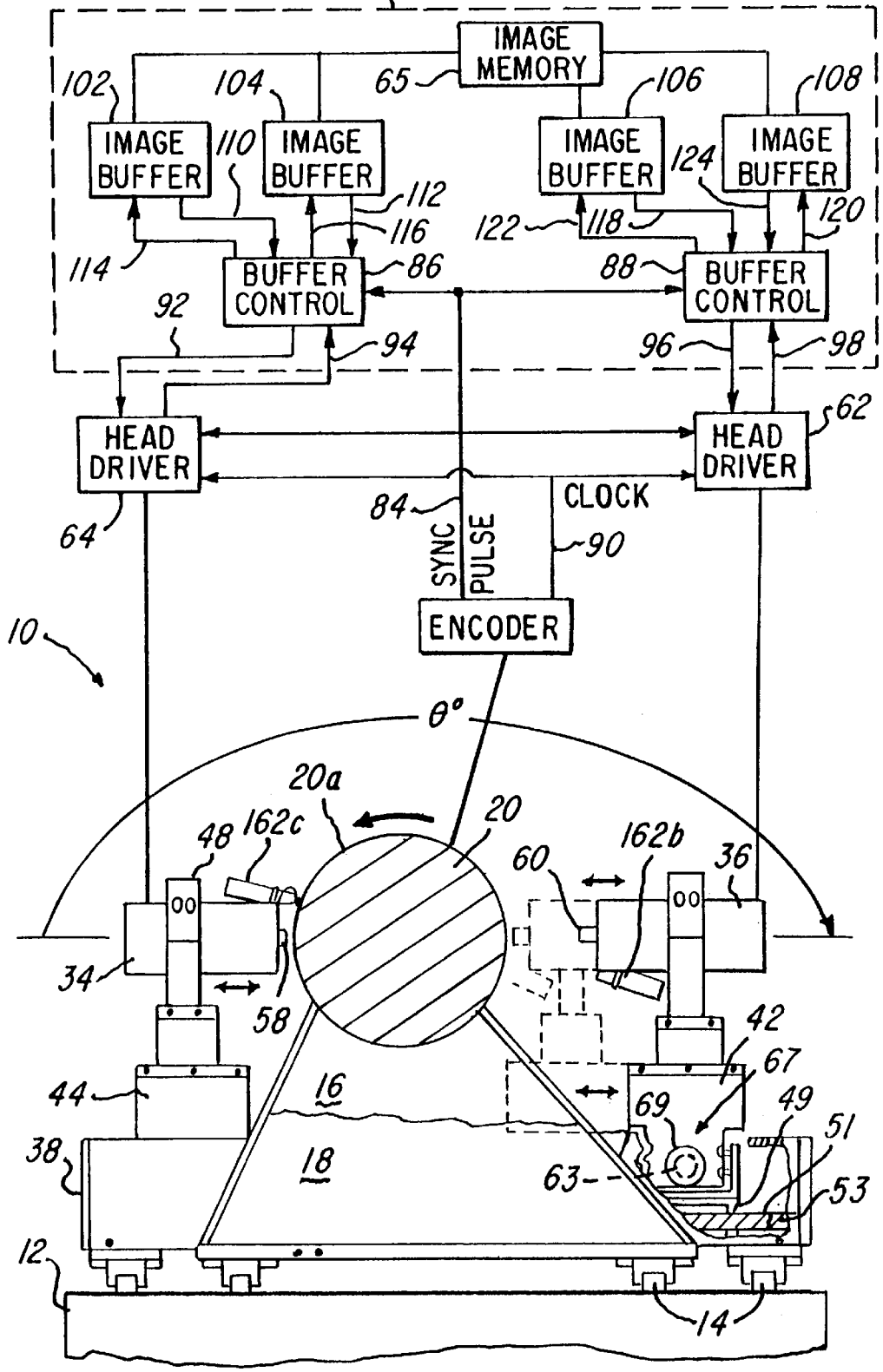

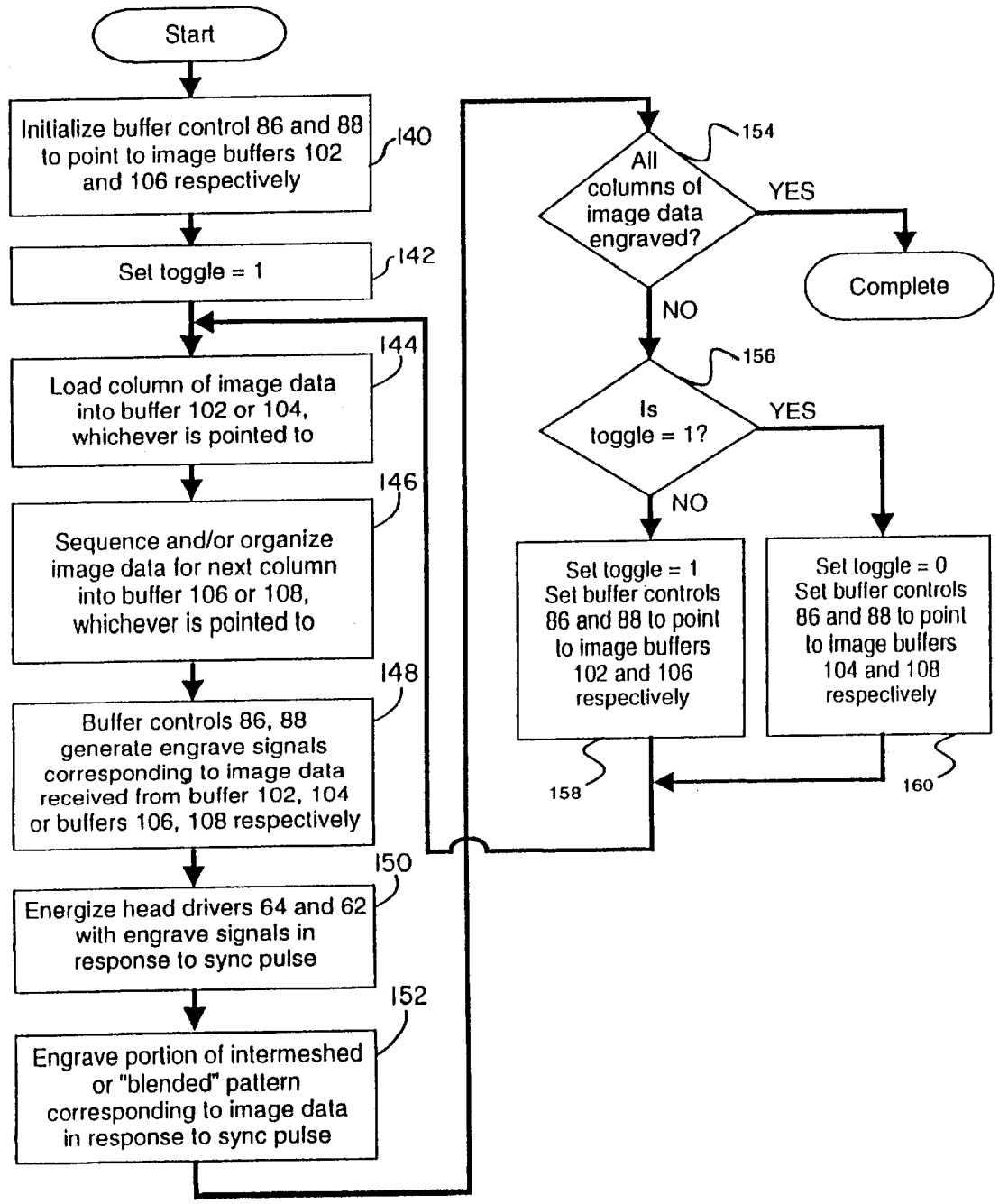

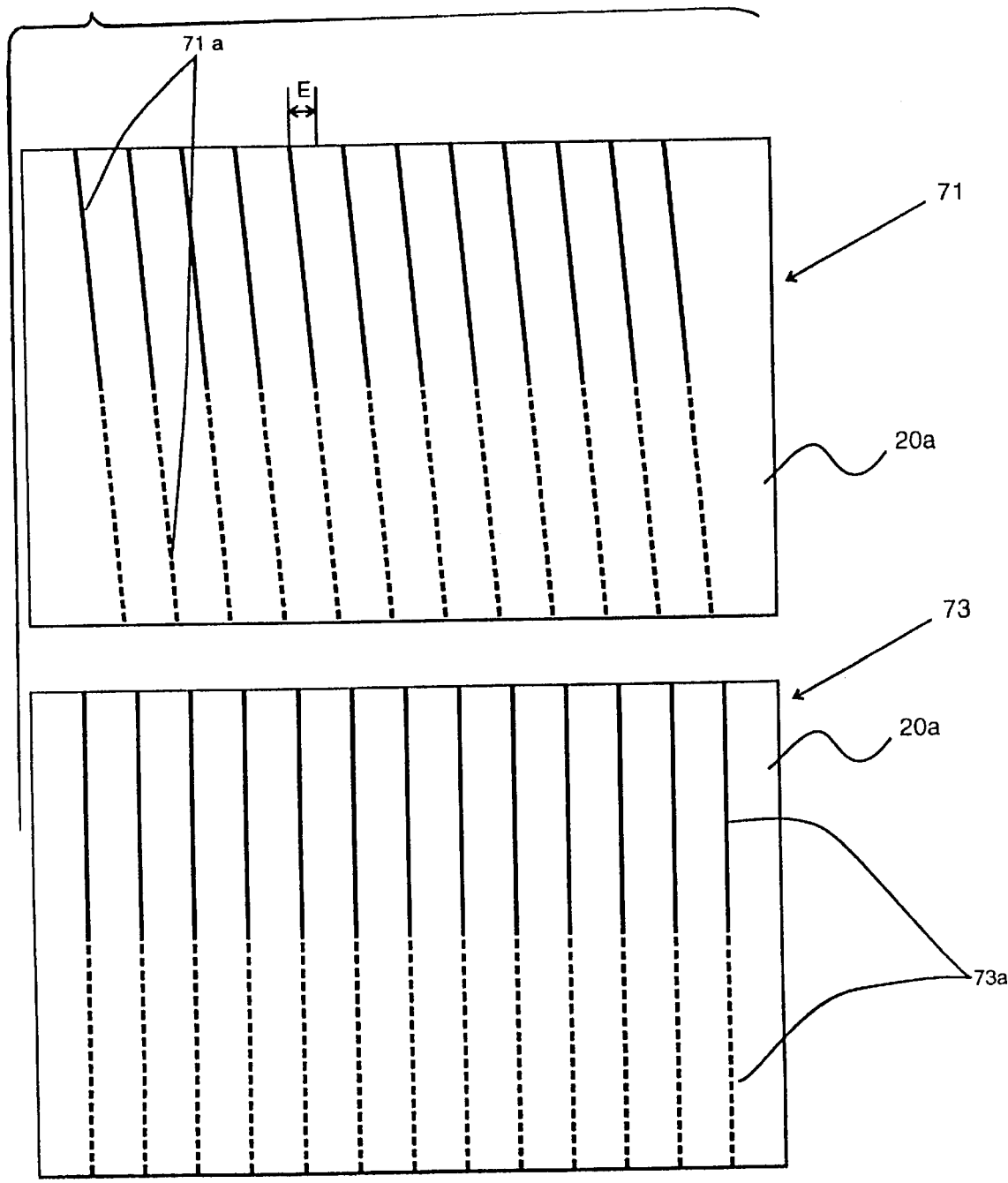

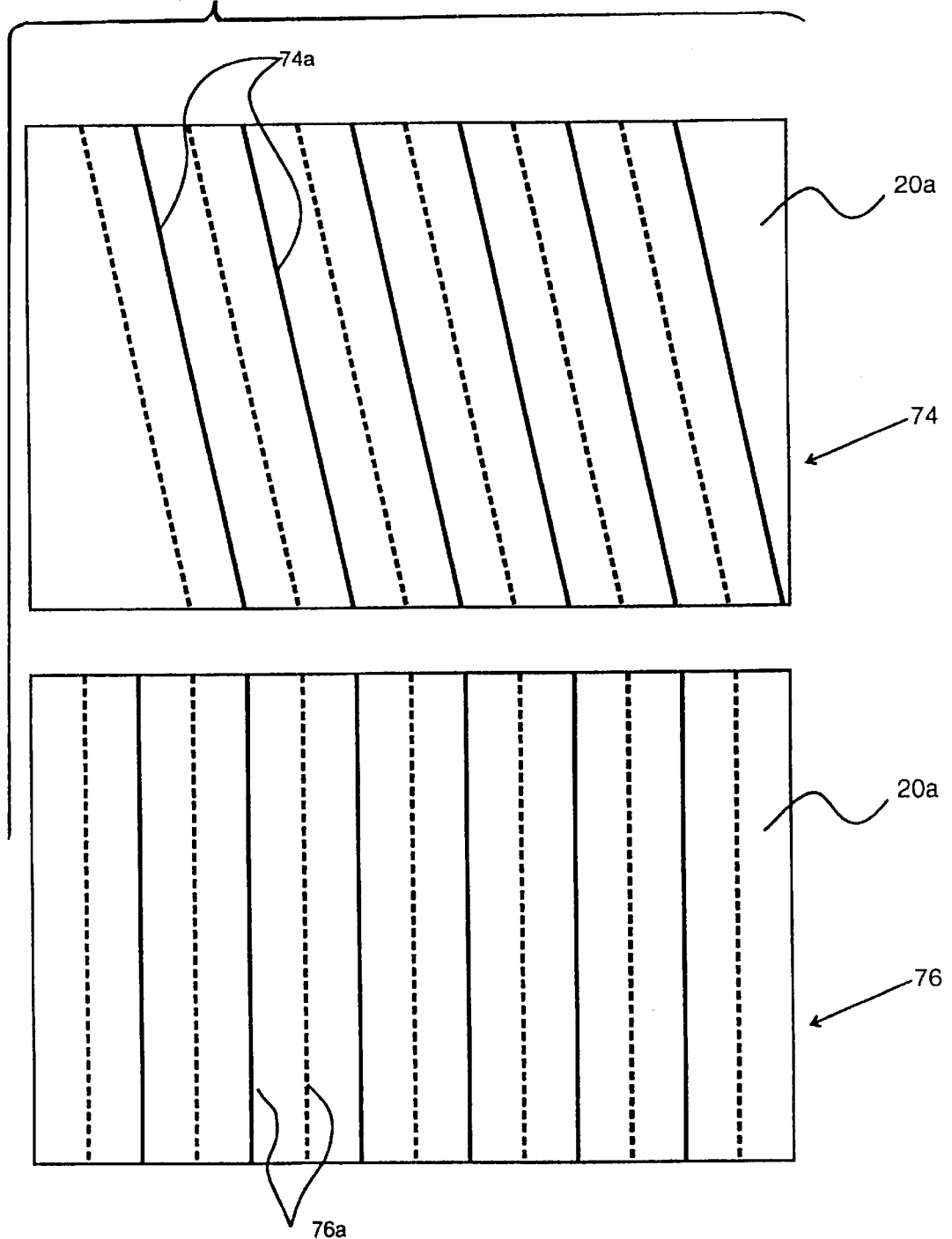

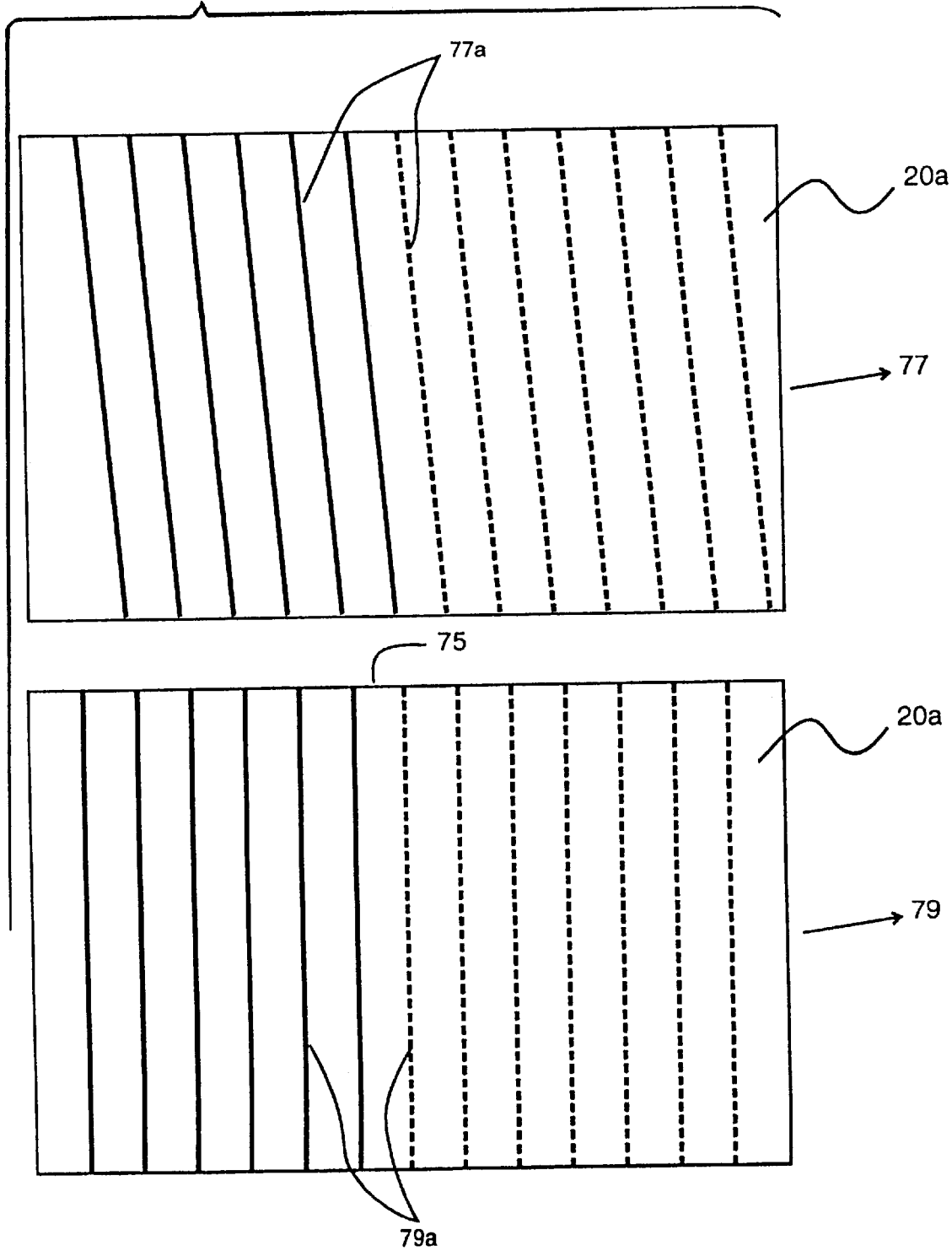

ENGRAVING SYSTEM AND METHOD COMPRISING DIFFERENT ENGRAVING DEVICES

CROSS-REFERENCE TO RELATED APPLICATIONS

This application is a continuation-in-part of U.S. Ser. No. 08/887,179 filed Jul. 2, 1997 which is a continuation of U.S. Ser. No. 08/429,344 filed Apr. 26, 1995, now U.S. Pat. No. 5,663,802.

BACKGROUND OF THE INVENTION

1. Field of the Invention

This invention relates to a system and method for engraving using multiple engraving heads, and more particularly, to a multi-purpose engraver capable of performing engraving and exposing of workpieces.

2. Description of Related Art

The electro-mechanical engraving of a gravure cylinder involves rotating a cylinder while actuating an engraving head, or engraving heads having a diamond stylus carried on an oscillating shaft. The stylus cuts or engraves cells, lines of cells or tracks into the surface of the cylinder to produce an engraved cylinder for use in a printing process. The engraved cylinder is normally used in a web-type gravure printing press for printing paper, plastic, metallic film material, or other printed material.

In engravers for engraving cylinders used for printing publications, such as magazines or the like, the engraver may include multiple engraving heads wherein each engraving head includes a diamond stylus. By providing multiple heads, each head may be used to engrave different portions of the cylinder wherein each portion of the cylinder engraved by a respective head may, by way of example, correspond to a different page of the publication.

The movement of the styli for performing the engraving operation is precisely controlled to ensure that the engraved cells, or lines of cells or tracks formed by each engraving head are located at the desired positions on the cylinder. However, the initial positioning of the engraving heads relative to each has historically been very labor intensive wherein a skilled worker manually adjusts the position of each engraving head prior to an engraving operation.

Because of the manual intervention and because the styli of each engraver head wears differently, varying copper hardness in the surface of the cylinder, and differences in engraving response, characteristics of each engraving head and the like, it was difficult to use two or more engraving heads to engrave a continuous pattern. The cells or areas engraved by the different heads would not match-up, thereby creating an undesirable seam in the cylinder which may subsequently cause a visible printing defect.

Prior art etching systems gave the user the ability to laser expose resist on a surface of a workpiece. The workpiece would then be removed from the exposing device and subsequently etched (for example, chemically) in a manner conventionally known. Such exposing systems include the Digilas System and laser unit available from Schepers Druckformtechnik, Wüllener Strasse 60, 48691 Vreden, Germany; the Think™ system offered by Think Laboratory Co., Ltd., 610-1 Umebayashi, Toyofuta, Kashiwa-shi, Chuba, Japan.

Prior art engraving systems provided means for engraving surfaces of workpieces using, for example, an electro-mechanical engraving head, a magnetostrictive engraving head, a piezo-electric engraving head, or a non-electro-mechanical engraving head, such as a laser engraving head. Prior art engraving systems included the Models 800 and 900 Systems available from Ohio Electronic Engravers, Inc., 4105 Executive Drive, Dayton, Ohio 45430; the LaserStar™ and GravoStar™ Systems available from MDC Max D ätwyler AG, Flugpatz CH-3368, Bleienbach, Switzerland; as well as the K405 and K406 Systems available from Linotype Hell AG, Grenzstraβe 2, 2300 Kiel 14, Federal Republic of Germany.

Thus, if a user desired to laser etch a workpiece and engrave either the same or a different workpiece, two separate systems had to be acquired because prior art systems lacked the ability to provide a single, multi-purpose system and method which enabled a user to both engrave and laser expose for etching one or more workpieces. This resulted in additional expense and required the user to have specially trained personnel.

Accordingly, there exists a need for a system and method for enabling multiple or a plurality of devices to be used in engraving and exposing, thereby facilitating engraving using multiple engraving techniques, including laser exposing, electro-mechanical engraving, laser engraving and the like.

SUMMARY OF THE INVENTION

In one aspect of this invention, this invention comprises an engraving system consisting of a plurality of engraving devices and a processor coupled to said plurality of engraving devices for energizing each of said plurality of engraving devices to engrave an intermeshing pattern.

In another aspect, this invention comprises a method for engraving an intermesh pattern on a cylinder in an engraver consisting of the steps of situating a plurality of engraving devices in operative relationship to said cylinder and engraving said intermesh pattern.

In still another aspect, this invention comprises a method for engraving a cylinder using a plurality of engraving heads consisting of the steps of situating a plurality of engraving heads in operative relationship with said cylinder and simultaneously energizing the plurality of engraving heads to engrave a blended pattern on the cylinder.

In yet another aspect an engraver comprises an engraving bed comprising a headstock and a tailstock adjustably mounted thereon, the headstock and tailstock being capable of rotatably supporting a cylinder therebetween, a carriage slidably mounted on the engraving bed; a first engraving head slidably mounted on the carriage; a second engraving head slidably mounted on the carriage; the first and second engraving heads having a circumferential offset therebetween; and, a first and second engraving head driver for energizing each of the first and second engraving heads, respectively, to engrave at least one pattern on the cylinder wherein the at least one pattern comprises tracks of engraved areas which were engraved by the first and second engraving heads.

In still another aspect, a method of engraving a pattern comprised of a plurality of tracks of engraved areas, comprises the steps of engraving at least one of the plurality of tracks with a first head, and engraving another of the plurality of tracks with a second head.

Therefore, it is an object of the present invention to provide a system and method for engraving a blended or intermeshed pattern using a plurality of engraving heads.

It is a further object of the invention to provide a system and method for engraving a continuous pattern of engraved areas engraved from a plurality of engraving heads.

It is yet another object of the invention to provide a system and method for imaging engraved areas which were engraved by the plurality of engraving heads in order to facilitate blending or intermeshing the engraved areas to provide a continuous engraved pattern.

Still another object of the invention, is to provide a single, multi-purpose system and method for engraving a workpiece using multiple engraving techniques.

Another object of the invention is to provide a single method and apparatus which enables exposing a resist on a workpiece for facilitating etching the workpiece and also provides an engraving device or head for engraving either the same workpiece or a second workpiece.

Other objects and advantages of the invention will be apparent from the following description, the accompanying drawings, and the appended claims.

BRIEF DESCRIPTION OF ACCOMPANYING DRAWINGS

FIG. 3 is a partially fragmented end view of the engraving system shown in FIG. 1 and also showing certain features of a processor used in the engraving system;

FIG. 5 is a general flowchart of a method for sequencing or organizing image data for use in the engraving system;

FIGS. 6A–6C show "laid-open" views of a cylinder showing various illustrative combinations of helically or cylindrically engraved tracks or lines of engraved areas engraved by the multiple engraving heads used in the engraving system with each track or line comprising, for example, a plurality of cells, channels and/or highlight cells;

DETAILED DESCRIPTION OF THE PREFERRED EMBODIMENTS

Figure 1:
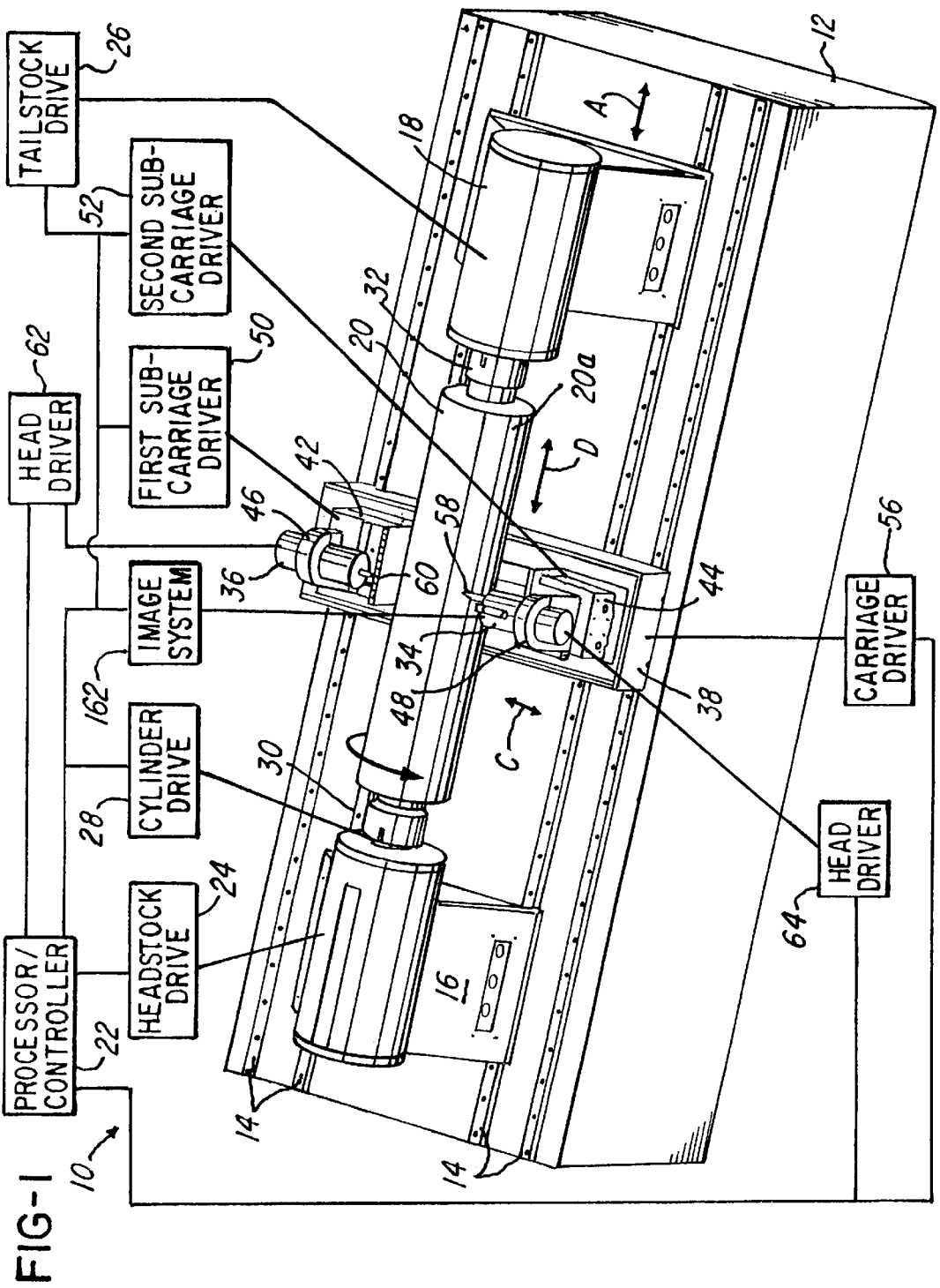
FIG. 1 is a general perspective view of an engraving system in accordance with one embodiment of the invention.

Referring now to FIG. 1, an engraving system or engraver 10 is shown having an engraving bed 12. The engraving bed 12 has a plurality of tracks or guide rails 14, upon which a headstock 16 and a tailstock 18 are slidably mounted so that they can move towards and away from each other (i.e., in the direction indicated by double arrow A in FIG. 1).

The headstock and tailstock 16 and 18 are capable of rotatably supporting a cylinder 20 using cone supports 30 and 32, respectively, for unshafted cylinders and using chucks (not shown) for cylinders having one or more shafts.

The engraver 10 also comprises a processor or controller 22 for controlling the operation of the engraver 10. The engraver 10 further comprises a headstock drive 24 and a tailstock drive 26 which are both coupled to controller 22 and which may be energized by controller 22 to cause the headstock 16 and tailstock 18, respectively, to move or be driven simultaneously or independently towards and away from each other. In this regard, the headstock and tailstock drives 24 and 26 may comprise various gears, pulleys and/or leadscrews (not shown) to facilitate driving the headstock 16 and tailstock 18. It should be appreciated also that this invention may be used in an environment where, for example, the headstock 16 is stationary. The drive system may include features taught and described in U.S. Pat. No. 5,329,215, which is assigned to the same assignee as the present invention, and which is hereby incorporated by reference and made a part hereof.

The controller 22 is also coupled to a cylinder drive 28 which may be associated with either or both headstock 16 and tailstock 18 for rotatably driving a cylinder 20 at an engraving station of engraver 10 in response to a cylinder drive signal received from controller 22.

The engraver 10 also comprises a multiple or plurality of engraving heads 34 and 36 which are slidably mounted on a carriage 38 which itself is slidably mounted on guide rails 14 on engraving bed 12 as shown. As best illustrated in the fragmentary top view of FIG. 2, notice that carriage 38 comprises a guide rail or track 40 upon which subcarriages 42 and 44 are slidably mounted such that they can move towards and away from each other in the direction of double arrows B and C, respectively. The engraving heads 34 and 36 may be mounted on subcarriages 42 and 44, respectively, with suitable brackets 46 and 48, as shown.

As best illustrated in FIG. 3, the engraving head 34 comprises an engraving device 58 and engraving head 36 comprises an engraving device 60 which are each capable of engraving engraved areas, including, for example, a series of cells 66, channels 68 and/or highlight cells 70 (FIG. 4B) as desired, into a surface 20a of cylinder 20. Notice that, in the embodiment being described, the engraving devices 58 and 60 are cylindrically offset or positioned on angle θ (FIG. 3) approximately 180° apart. It should be appreciated, however, that the engraving devices 58 and 60 could be positioned at any suitable cylindrical offset or angular distance relative to each other as desired to effect engraving. In this regard, the engraver 10 may comprise an adjuster or means for adjusting (not shown) the angular displacement or distance θ between engraving devices 58 and 60.

Figure 2:
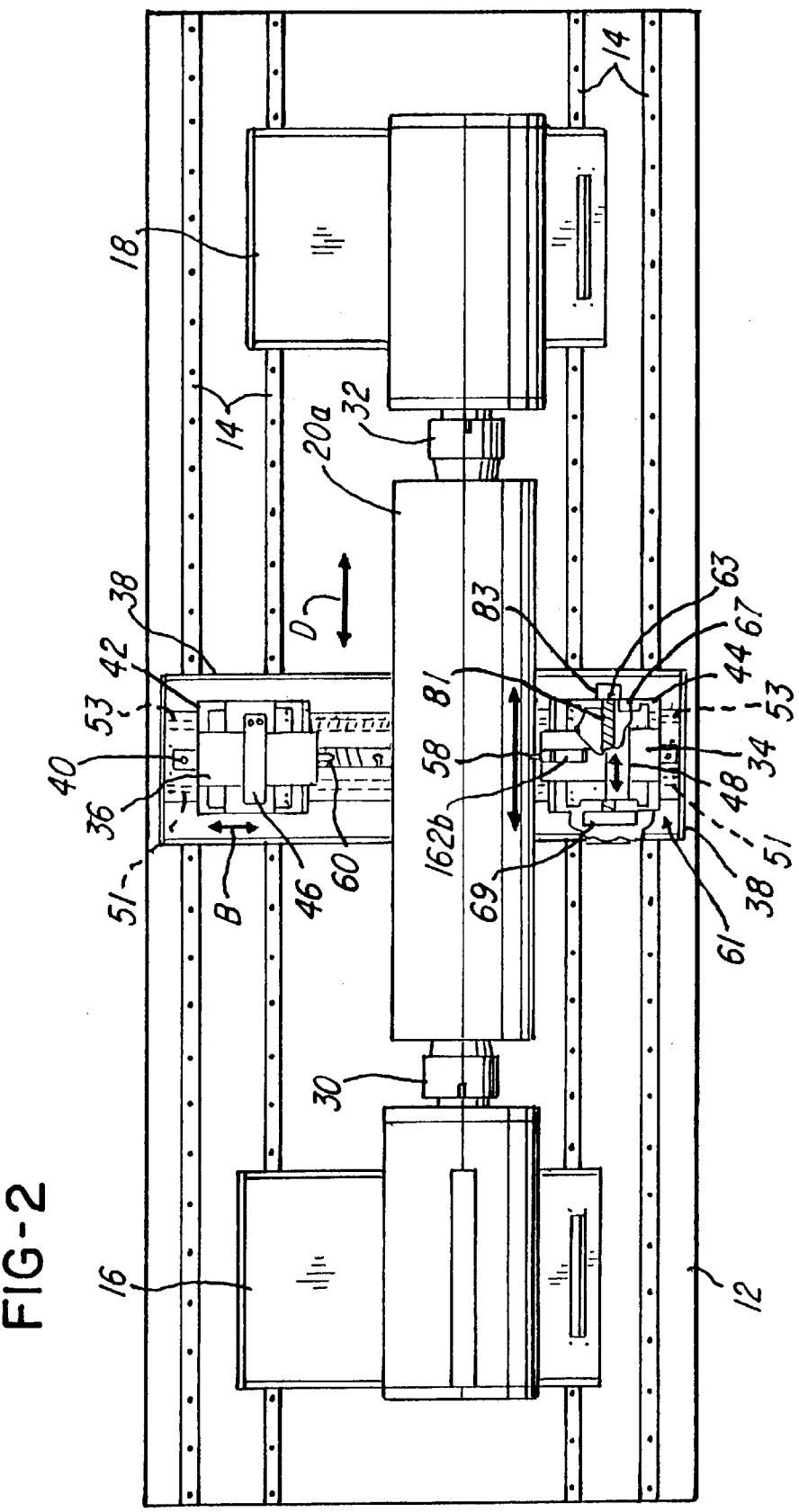
FIG. 2 is top view of the engraving system shown in FIG. 1.

While FIG. 2 shows engraving devices 58 and 60 positioned such that they are substantially opposite each other, it should be noted that the carriage 38 could be modified such that the heads 36 and 34 are positioned adjacent to each other such that they engrave the cylinder 20 from the same side. In this event, the circumferential, angular displacement or offset would be zero or near zero.

It should also be appreciated that while the embodiment shown and described herein shows only two heads, it could comprise more heads or engraving devices as desired, in which case additional carriages, subcarriages, engraving head drivers and carriage drivers may be required.

In the embodiment being described, the engraving heads 34 and 36 and associated engraving devices 58 and 60 may comprise any suitable means for engraving surface 20a of cylinder 20. For example, a gravure engraving head and stylus of the type shown in U.S. Pat. Nos. 4,357,633; 4,438,460; 4,450,486; 4,451,886 and 4,500,929, which are incorporated herein by reference and made a part hereof, may be used. Alternatively, a magnetostrictive engraving head using a magnetostrictive member comprising a magnetostrictive actuator comprising $Tb_5Dy_{1-x}Fe2$ of the type shown and described in U.S. Pat. No. 5,491,559, which is assigned to the same assignee as the present invention and which is incorporated herein by reference and made a part hereof, may be suitable. The method and system described herein may also be utilized with a laser engraving device (not shown) of the type used in laser engraving.

As illustrated in FIG. 1, the engraver 10 comprises a first head driver 62 and a second head driver 64 which are coupled to processor 22 and to engraving heads 34 and 36, respectively. The engraving head drivers 62 and 64 are capable of energizing engraving heads 34 and 36, respectively, in response to a drive signal received from controller 22.

The engraver 10 comprises a first subcarriage driver 50 (FIG. 1) and a second subcarriage driver 52 which are coupled to the first subcarriage 42 and second subcarriage 44, respectively, and which are also coupled to processor 22. Processor 22 is capable of selectively first and second subcarriage drivers 50 and 52 to step or drive subcarriages 42 and 44, respectively, and engraving heads 34 and 36 towards and away from each other as desired in order to position engraving heads 34 and 36 into and out of an operative relationship with cylinder 20.

The engraver 10 also comprises a carriage driver 56 which is coupled to the main carriage 38 and to processor 22 such that processor 22 can selectively energize carriage driver 56 to drive carriage 38 along guide rails 14 and in directions indicated by double arrow D (FIGS. 1 and 2) in order to effect engraving.

In the embodiment being described, the first and second carriage drivers 50 and 52 comprise a plurality of leadscrews 51 and 53 (FIGS. 2 and 3) which are rotatably mounted in suitable bearings (not shown) underneath carriage 38 and above tracks 14. The leadscrew 51, for example, cooperates with a threaded opening 49 (FIG. 3), in a wall 39 in sub-carriage 42, thereby driving the carriage 42 towards and away from cylinder 20 in response to the revolution of the leadscrew 51. Leadscrew 53 and sub-carriage 44 operate in a similar manner. The carriage drivers 50 and 52 also comprise stepper motors (not shown) coupled to processor 22 for selectively driving the leadscrews 51 and 53, thereby enabling sub-carriages 42 and 44 to be selectively driven towards and away from the cylinder 20.

In the embodiment being described, the engraver 10 also comprises a horizontal positioner 61 (FIG. 2) associated with sub-carriage 42 and coupled to processor 22 for adjustable positioning head 34 on sub-carriage 44, thereby enabling a horizontal or longitudinal relationship or distance between engraving device 58 and engraving device 60 to be adjusted. Although not shown, a similar positioner could be used relative to sub-carriage 42.

As illustrated in FIGS. 2 and 3, the positioner 61 comprises a leadscrew 63 which is rotatably mounted in threaded opening 81 in a housing 67 of sub-carriage 42. The positioner 61 comprises a stepper motor 69 coupled to processor 22 which rotatably drives leadscrew 63 in response thereto. Positioner 61 also comprises an encoder 83 coupled to processor 22 and associated with leadscrew for feeding information back to processor 22 regarding the position of sub-carriage 44 and engraving device 58 on carriage 38. As is described later herein, the positioner 61 provides means for adjusting, if necessary, the longitudinal (i.e., relative to cylinder 20) distance between engraving devices 58 and 60. This may be necessary when engraving tracks engraved by the different heads have to be offset.

It may be desired to incorporate carriage features illustrated in U.S. Pat. No. 5,492,057, which is assigned to the same assignee as the present invention and which is incorporated herein by reference and made a part hereof, although the advantages of the invention may be achieved without such features.

As illustrated in FIG. 3, engraver 10 further comprises an encoder 82 operatively associated with the cylinder drive 28 (FIG. 1) and which is capable of generating a synchronizing or sync pulse on line 84 (FIG. 3) which is received by head drivers 62 and 64, a first buffer control 86 and a second buffer control 88 which may be resident in processor 22. Encoder 82 also generates a clock pulse on line 90 which may be used to facilitate accessing image data corresponding to at least a portion of the intermeshed or blended pattern 72. The image data stored in sequential memory 65 in processor 22 and subsequently passed to head drivers 62 and 64 in a manner described later herein. The synchronizing pulse from encoder 82 causes the toggling of the first and second buffer controls 86 and 88 associated with head drivers 62 and 65, respectively. In this regard, buffer control 86 transmits image data along line 92 to head driver 64 and also receives clock pulses on line 94. Likewise, the second buffer control 88 transmits image data for engraving head 36 to engrave to head driver 62 via line 96 and receives clock pulses from head driver 62 on line 98.

Processor 22 may also comprise a plurality of image buffers such as buffers 102, 104, 106 and 108 (FIG. 3).

Figure 4A:
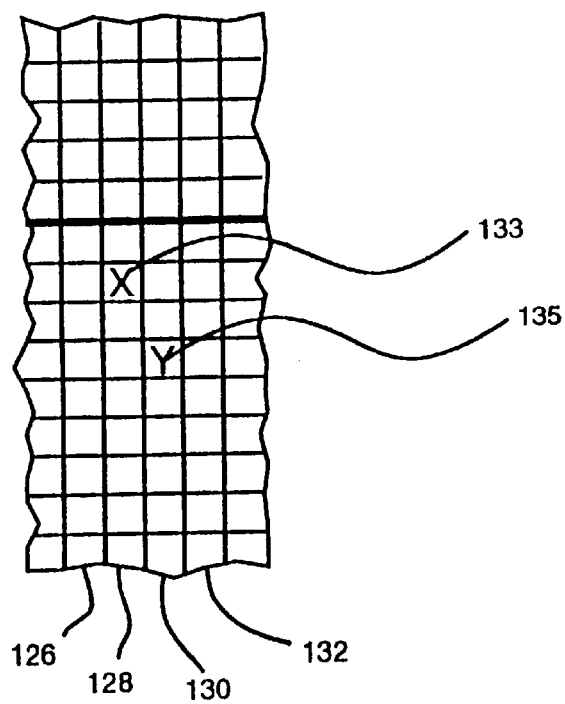
FIG. 4A is a fragmentary view of an image memory showing a plurality of storage locations for storing a plurality of columns of image data corresponding to at least a portion of an image to be engraved.
Figure 4B:
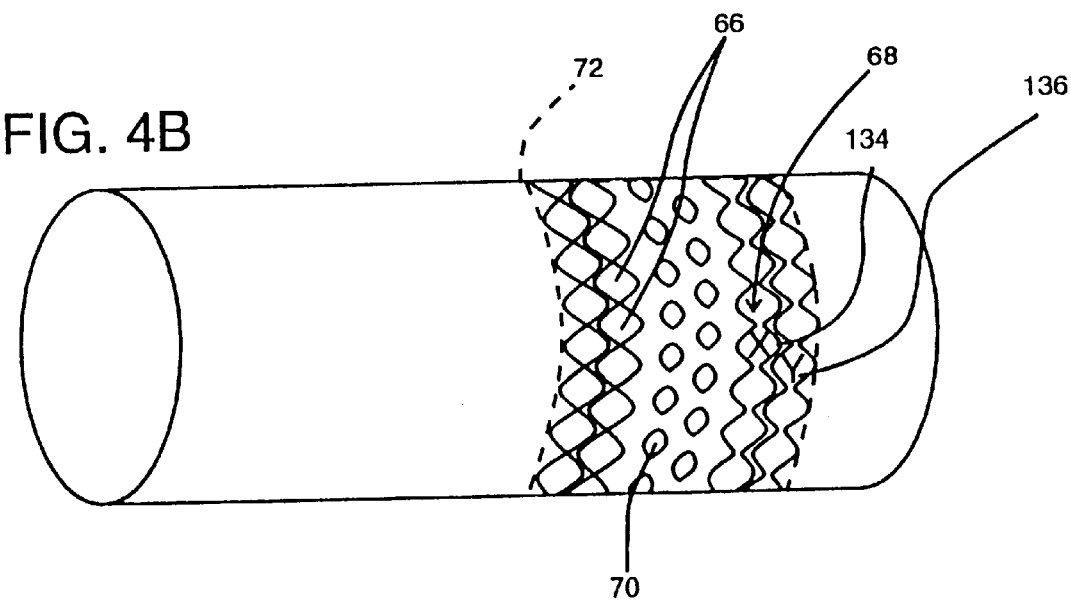
FIG. 4B is a view of an intermeshed or blended engraved pattern showing a plurality of cells corresponding to a portion of the image data in FIG. 4A.

Image buffers 102 and 104 transmit data along lines 110 and 112, respectively, in response to a clock pulse received on lines 114 and 116. In a similar manner, image buffers 106 and 108 transmit data along lines 118 and 120 to buffer control 88 in response to clock pulses received on lines 122 and 124, respectively. For purposes of illustrating the sequencing and synchronizing of image data associated with at least a portion of the blended pattern 72 to be engraved on cylinder 20, FIG. 4A is a fragmentary view which illustrates a portion of sequential memory having pixel density or imaged data associated with, for example, a pair of columns or density values for cells, such as 126 and 128 in FIG. 4B, to be engraved on a surface 20a of cylinder 20. For example, image data values X and Y (FIGS. 4A and 4B), corresponding to densities value for areas of an image (not shown) to be engraved is stored in image memory locators 133 and 135.

Because of the angular or circumferential displacement between the heads 34 and 36, it may be necessary to organize or process the image data stored in image memory 65 and corresponding to blended pattern 72 to be engraved so that the image data is organized and sequenced such that the engraving performed by heads 34 and 36 becomes blended, joined, complementary and/or intermeshed as desired.

FIG. 4A illustrates a representation of a plurality of columns 126, 128, 130 and 132 of image data, corresponding to at least a portion of blended or intermeshed pattern as stored in memory (not shown) of processor 22'. In the embodiment being described, the image data corresponding to an image to be engraved is stored serially or sequentially by columns. It is important that when head drivers 62 and 64 energize engraving heads 36 and 34, respectively, in response to signals corresponding to the image data, the image data be buffered, organized and/or sequenced such that engraved areas, such as areas 134 and 136 (FIG. 4B) corresponding to data X and Y and memory locations 133 and 135 (FIG. 4A) are engraved in proper sequence and order. The sequence and order may also be affected by the cylindrical offset or angular displacement, as identified by θ in FIG. 3. In the embodiment being described, the angular displacement is about 180° as described earlier herein, and it could go up to 360°; however, it has been found that between 90° and 270° is preferable.

Accordingly, processor 22 comprises a double buffered memory arrangement for each head driver 62 and 64. In the embodiment being described, the double buffered memory generally operates on a first in, first out basis.

In this regard and as shown in FIG. 5, the buffer controls 86 and 88 are initialized to point to image buffers 102 and 106, respectively (block 140). At block 142 a toggle is set equal to 1. Thereafter, a column of image data, such as data column 126 in FIG. 4A is loaded into buffer 102 at block 144. In order to sequence and time the engraving performed by engraving head 36, the last one-half (180° divided by 360°) of the next column of image data, such as column 128 in FIG. 4A followed by the first half of that column of image data is loaded into image buffer 106 (block 146). Buffer controls 86 and 88 generate (block 148) engraving signals corresponding to the image data received from buffers 102 and 106, respectively. Buffer controls 86 and 88 transmit engraved drive signals to head drivers 64 and 62, respectively, via lines 92 and 96 in response to the synchronizing pulse or sync pulse received on line 84 from encoder 82 (block 150). Head drivers 62 and 64 then energize engraving heads 36 and 34, respectively, to engrave at least a portion of the pattern corresponding to the image data (block 152).

If all columns of image data have been engraved at decision block 154, then the routine exits; otherwise it proceeds to process more columns of image data from memory 65. At decision block 156, it is determined whether the toggle is equal to one, which it will be the first time through the routine, in which case it proceeds to block 160 where the toggle is set to zero and the buffer controls 86 and 88 are energized to point to image buffers 104 and 108, respectively. If the decision at decision block 156 is negative, then the toggle is set to 1 and the buffer controls 86 and 88 are energized to point to image buffers 102 and 106, respectively (block 158). The routine proceeds back to block 144, as shown, so that further columns of image data from image memory 65 (FIG. 3) can be processed and engraved.

It is a feature of this invention to provide a system and method for engraving a surface 20a of cylinder 20 with a plurality of cells 66, channels 68 and/or highlight cells 70 using a plurality of engraving heads 34 and 36. It is a further feature of this invention to provide a plurality of engraving heads 34 and 36 for independently or simultaneously engraving the areas which make up a seamless intermeshing or blended pattern, such as pattern illustrated in FIGS. 6A–6C and FIG. 7.

In the embodiment being described relative to FIGS. 6A–6C, it should be appreciated that the solid-line tracks comprise areas engraved by engraving head 34, while the dashed-line tracks represent areas engraved by engraving head 36. For ease of illustration, each track was engraving during a full or partial revolution of cylinder 20.

In situations where there is a single engraving track (like helical pattern track 71 in FIG. 6A) or where there are multiple, cylindrical or "step-over tracks" 73a which make up a pattern like pattern 73 in FIG. 6A, it may be desirable to have engraving heads 34 and 36 substantially simultaneously engrave the cells 66, channels 68 and highlight cells 70 which make up the single helical engraving pattern 71. In this case, it is important, if not essential, to ensure that engraving heads 34 and 36 are properly synchronized and timed so that each of engraving tracks 71a appears continuous.

When engraving a pattern like the pattern 71 illustrated in FIG. 6A, for example, the heads 34 and 36 are caused to be positioned such that engraving devices 58 and 60 are displaced a distance E when engraving the helical track 71a. In contrast, for cylindrical or step-over engraving patterns (such as is illustrated in pattern 73 in FIG. 6A), the distance E is zero so that the devices 58 and 60 engrave along the same cylindrical track 73a.

After each individual track 71a of pattern 71 is engraved, processor 22 energizes carriage driver 56 to drive or step carriage 38 the distance E (for pattern 71 in FIG. 6A) or 2×E (for pattern 73 in FIG. 6A) so that heads 34 and 36 can engrave the next track.

FIG. 6B illustrates two other patterns 74 and 76 where multiple engraving tracks 74a and 76a which are adjacent and complementary to each other may be engraved by engraving heads 34 and 36, respectively. In this situation, it is desirable to align or set engraving devices 58 and 60 of engraving heads 34 and 36, respectively, a distance of 2 times E (2×E) such that the engravers 58 and 60 travel a distance of 4 times E (4×E) during engraving a complete revolution of cylinder 20.

For engraving a helical pattern where the tracks engraved by heads 34 and 36 are continuously adjacent (like pattern 74 in FIG. 6B), the carriage driver 56 would be energized by processor 22 to drive carriage 38 the distance of 4 times E (4×E) during the engraving and as the cylinder rotates a complete revolution. For the stepover or cylindrical pattern 76, the carriage driver 56 is energized by processor 22 to drive or step carriage 38 the distance of 4×E after engraving a complete track, such as track 76a. It should be appreciated relative to FIG. 6B, that as carriage 38 is incremented or driven the distance 4×E, each engraving head 34 and 36 is incremented or driven that same distance. As shown in FIG. 6B, it may be desirable to have, for example, engraver 58 engrave track 74a while engraver 60 engraves track 76a in order to engrave the blended or intermeshed pattern 72.

Figure 7:
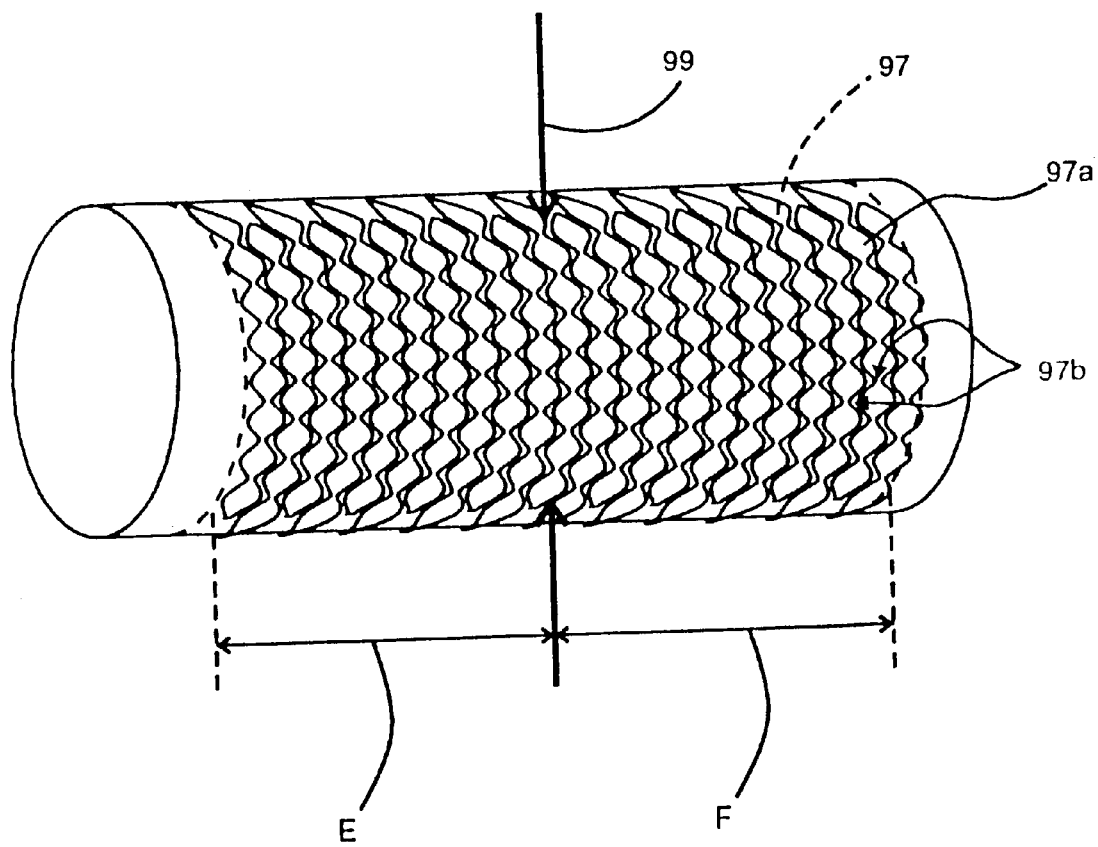
FIG. 7 is a further illustration similar to that in FIG. 6C showing a seam area formed by two engraved areas engraved by different engraving heads.

Regarding FIG. 6C, notice that a cylindrical pattern 79 is comprised of areas engraved by engraving heads 34 and 36, and this pattern is similar to an enlarged pattern 97 in FIG. 7 which comprises a plurality of cells 97a and channels 97b engraved by heads 34 and 36. Notice that where the areas engraved by the engraving heads 34 and 36 meet, a seam area, designated as 75 in FIG. 6C, is created. FIG. 6C illustrates a helical pattern 77 comprised of engraved areas engraved by engraving heads 34 and 36.

When engraving heads 34 and 36 are engraving areas or tracks which are not the same or which are not continually adjacent, but that meet to define a seam area, such as seam 75 in FIG. 6C or seam 99 in FIG. 7, then it is important that the seam 75 or seam 99 appear continuous so that no visible or undesirable discontinuity results. Thus, for example, if area E in FIG. 7 is engraved by head 34, while area F is engraved by head 36, then the area where their respective engraved areas meet and which defines seam 99 must "match-up" or be complementary otherwise an undesirable discontinuity may result.

A method of operating the engraving system will now be described.

The cylinder 20 is rotatably mounted between first and second cones 30 and 32 (FIG. 1). Image data corresponding to an image or portion of an image to be engraved is scanned or otherwise input into processor 22 and image memory 65 (FIG. 3). Processor 22 may then energize carriage driver 56 to position the engraving heads towards the leftmost end (as viewed in FIG. 1) of cylinder 20 whereupon one or more test cuts may be performed in order to adjust or calibrate the engraving heads 34 and 36 and, for example, the position of engraving device 58 relative to engraving device 60. In this regard, processor 22 may energize motor 69 or positioner 61 to adjust the longitudinal position of sub-carriage 44.

After the heads 34 and 36 and engraving devices 58 and 60 have been calibrated, processor 22 may selectively energize first subcarriage driver 50 and second subcarriage driver 52 to position engraving heads 34 and 36, respectively, in operative relationship with surface 20a of cylinder 20 so that engraving may begin. It should be noted that processor 22 can selectively energize first and second subcarriage drivers 50 and 52, as well as engraving heads 34 and 36 independently or simultaneously in order to effect the engraving described herein. Once the engraving heads 34 and 36 have been properly positioned relative to cylinder 20, engraving may begin.

Processor 22 may energize cylinder drive 28 to rotatably drive cylinder 20 and also energize carriage driver 56 to drive carriage 38 across the surface 20a of cylinder 20 so that engraving can be performed.

In this regard, processor 22 may begin processing image data stored in image memory 65 in accordance with the procedure described earlier herein relative to FIG. 5, thereby causing engraved areas comprising a plurality of cells 66, channels 68 and/or highlight cells 70 (FIG. 4B) or tracks of engraved areas to be engraved on surface 20a of cylinder 20, thereby defining an engraved pattern comprises of one or more of the patterns illustrated in FIGS. 6A–6C and FIG. 7, or some combination thereof.

Once the desired engraved image patterns have been engraved on cylinder 20, the processor 22 can again energize first and second subcarriage drivers 50 and 52 to actuate carriages 42 and 44, respectively, to move away from each other. The cylinder 22 may then be removed from the engraver 10 and subsequently used in a printing press or operative.

It should be noted that when co-mingling or combining engraved areas such as engraved areas engraved by head 34 with areas engraved by head 36, it is important to have the engraved areas match up or be continuous where their respective engraved areas meet, as mentioned earlier herein. Because of engraving problems such as stylus wear, varying copper hardness along the surface 20a of cylinder, differences in engraving head characteristics and the like, it may be important to adjust the engraving performed by engraving heads 34 and 36 so that their respective engraved areas appear continuous where they meet. Such adjustments may include causing processor 22 to adjust the position of the subcarriages 42 and 44 or the drive signals generated by head drivers 62 and 64 which are used to energize engraving heads 34 and 36, respectively.

Accordingly, engraver 10 may also comprise an image system or method 162 (FIG. 1), which is capable of imaging engraved areas during real time operation of the engraver. The image system 162 may comprises cameras 162a and 162b (FIG. 3) for optically imaging the surface 20a of cylinder 20. Characteristics of the engraved areas, such as width, depth, area, volume and the like, may then be determined and compared to desired characteristics. Processor 22 may use differences between actual and desired characteristics to adjust, for example, the drive signals used to energize engraving heads 36 and 34 and/or engraving devices 58 and 60 so that the areas engraved by the heads match or complement each other when they meet so that there is no undesirable seam or discontinuity in the pattern engraved on the cylinder 20.

The features embodied in the image systems shown and described in co-pending U.S. Pat. Nos. 5,424,845, 5,440,398 and U.S. patent application Ser. No. 08/415,638 which are assigned to the same assignee as the present invention and which are incorporated herein by reference and made a part hereof may be used in this invention.

Advantageously, this method and apparatus facilitates utilizing multiple engraving heads to effect engraving an image comprised of engrave areas from multiple engraving heads where the engraved areas are intermeshed, blended, co-mingled, joined or otherwise combined to provide an engraved area.

Figure 8:
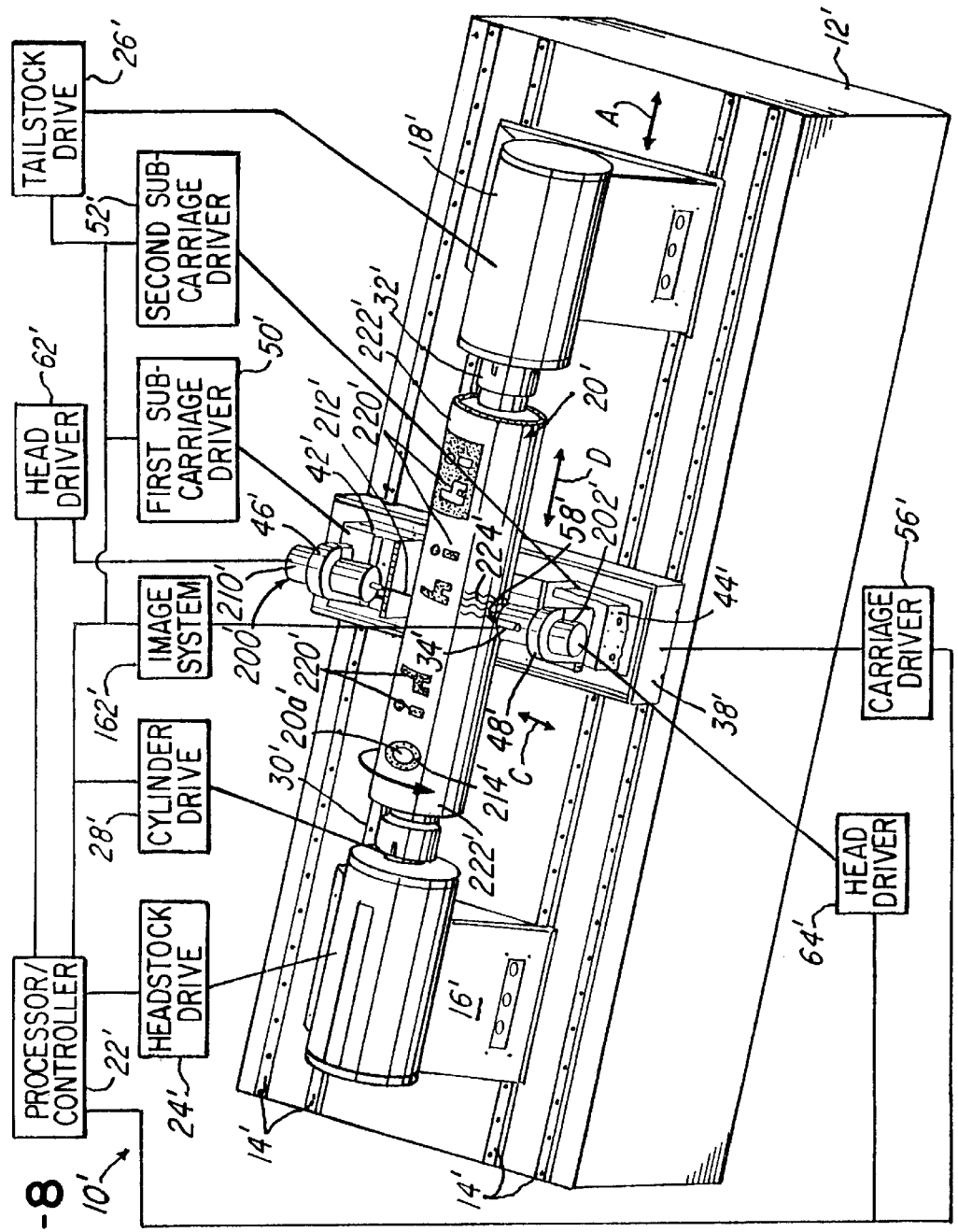
FIG. 8 is a general perspective view of an engraving system in accordance with another embodiment of the invention illustrating the laser exposing device in combination with a magnetostrictive engraving head.
Figure 9:
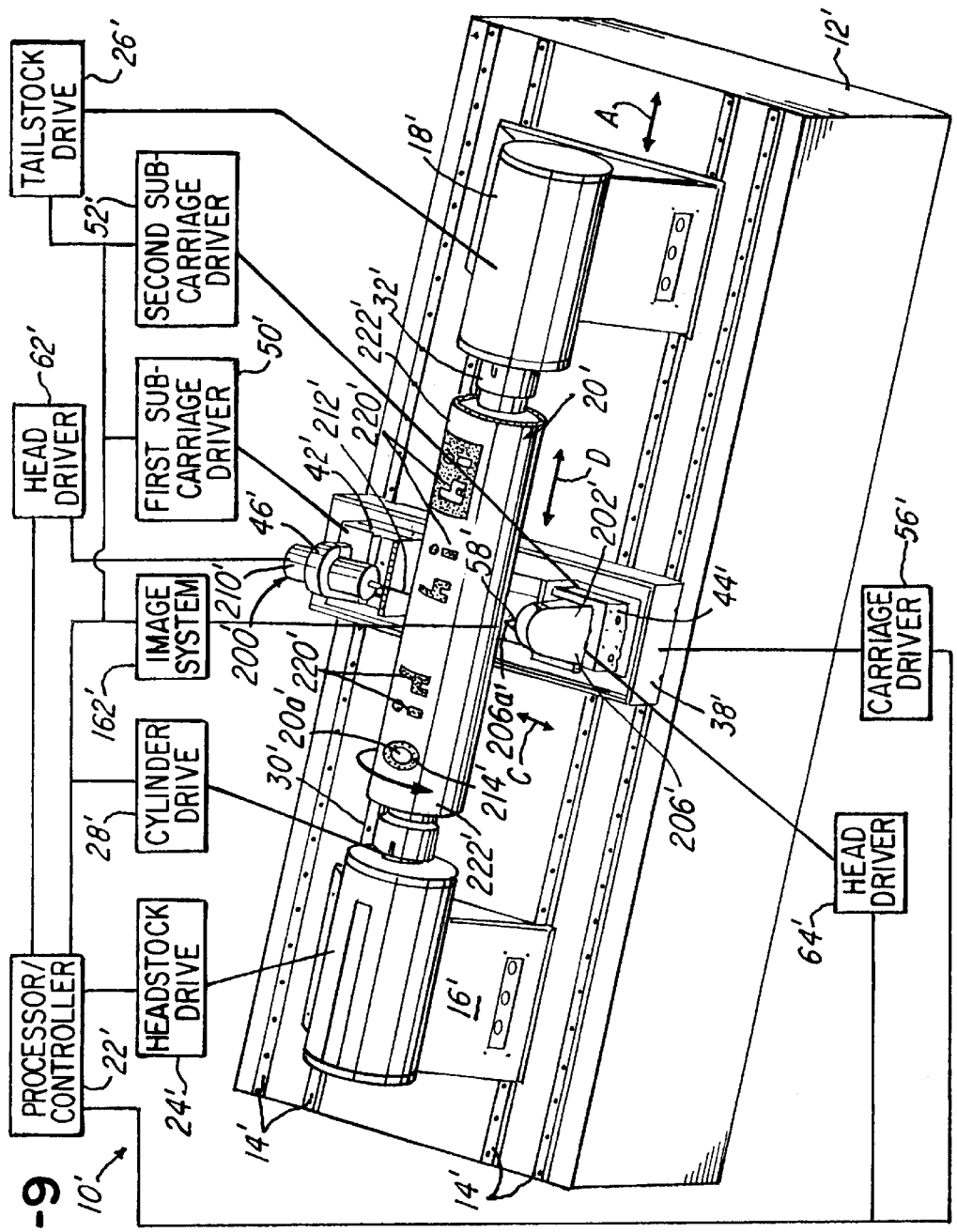
FIG. 9 is a general perspective view of an engraving system in accordance with another embodiment of the invention illustrating a laser exposing device in combination with an electro-mechanical engraving head.
Figure 10:
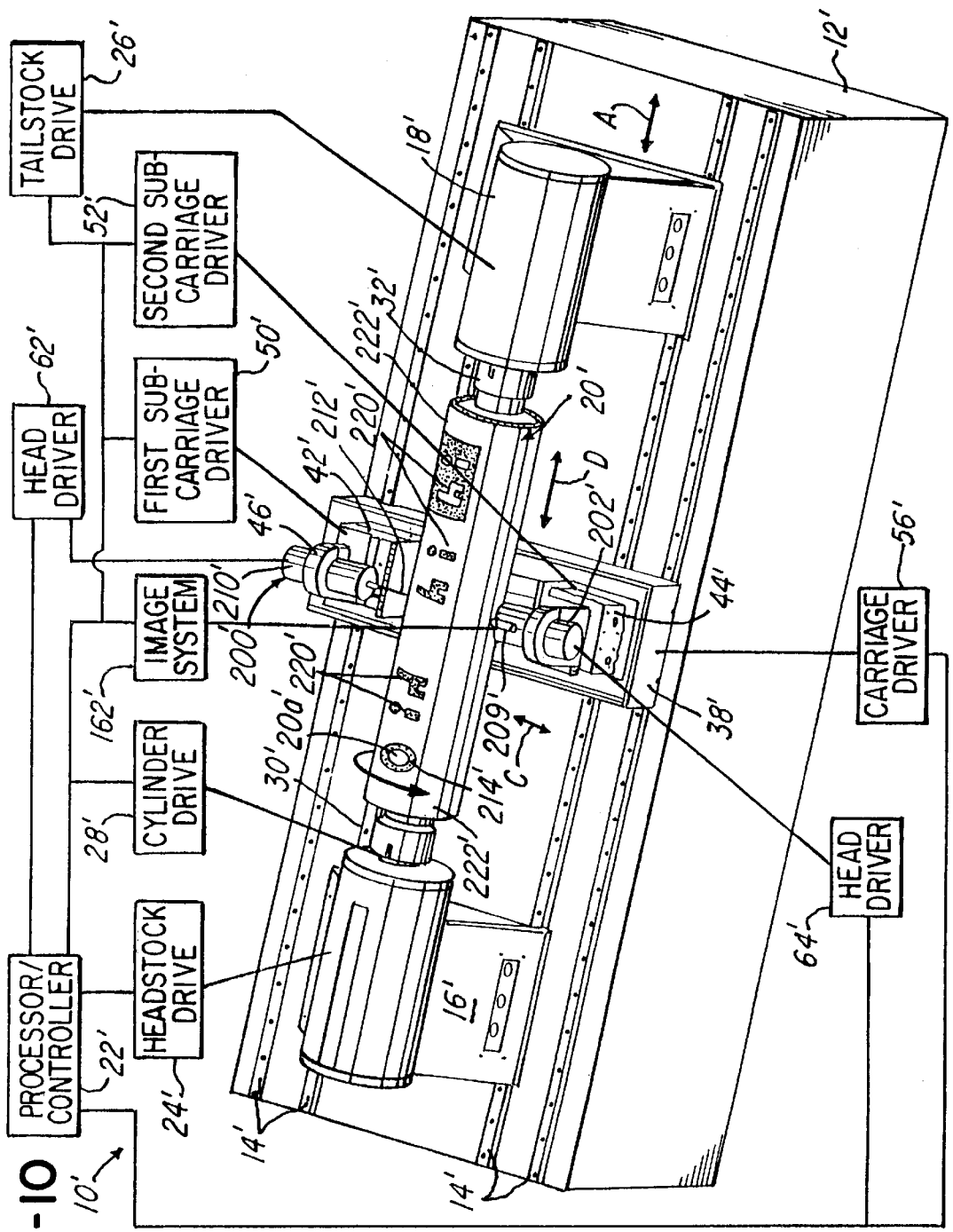
FIG. 10 is a general perspective view of an engraving system in accordance with another embodiment of the invention illustrating the use of a laser exposing device in combination with a laser engraving head.

Referring now to FIGS. 8–12, another embodiment of the invention is shown. Like parts have been identified with the same part numbers except that an apostrophe """ has been added thereto. In the embodiment shown in FIG. 8, the engraving system 10 comprises a first device or head 200' and a second device or head 202'. In the embodiment being illustrated, the first head 200' comprises a non-stylus or exposing head, while the second head 202' comprises an engraving head 206' (FIGS. 8–10). The second head 202' may comprise any suitable means for engraving surface 20a' of workpiece 20'. Thus, as mentioned previously, a gravure engraving head of the type shown in U.S. Pat. Nos. 4,357, 633; 4,438,460; 4,450,486; 4,451,886 and 4,500,929, all of which are incorporated herein by reference and made apart hereof, may be used. For example, FIG. 9 illustrates the use of a conventional electro-mechanical engraving head 206' having an engraving device 58' defining a stylus 206a' for engraving surface 20a' of workpiece 20'. The engraving head 206' is coupled and responsive to head driver 64' and controller 22' in a manner conventionally known and as taught and/or described in the aforementioned patents.

As illustrated in FIG. 8, the engraving head 202' may include a magnetostrictive engraving head 34' using a magnetostrictive member of the type earlier described and as shown in U.S. Pat. No. 5,491,559. The magnetostrictive engraving head 34' is coupled to head driver 64' and controller 22' in a manner conventionally known and as illustrated in the aforementioned patents.

Finally, the electro-mechanical head 202' may include a piezo-electric actuator (not shown) for driving engraving device 58' into engraving contact with surface 20a' of workpiece 20'.

As illustrated in FIG. 10 and as described below, the engraving head 202' may comprise a laser engraving head 209' for effecting engraving a pattern on a surface 20a'.

In the embodiment being described, the exposing head or first head 200' comprises a laser exposing head 210' coupled to controller 22'. The laser exposing head 210' is energized to generate a modulated laser beam 212' in synchronization with the rotation of cylinder 20a' to expose resist 214' which is conventionally situated on surface 20a' of workpiece 20'. Once exposed, the resist 214' defines a pattern comprising exposed areas 222' and non-exposed areas 220'.

In this regard, features of the Digilas System and laser unit available from Schepers Druckformtechnik, Wüllener Strasse 60, 48691 Vreden may be utilized for exposing resist 214'. Moreover, laser technology utilized in the Think™ systems offered by Think Laboratory Co., Ltd., 610-1 Umebayashi, Toyofuta, Kashiwa-shi, Chuba, Japan, may also be incorporated into head 200'.

In the embodiment being described, the laser beam 212' comprises a focus of about 10–20μ, while the exposing head 210' is axially fed at a rate of about 2.5–50 micrometers per revolution.

After the resist 214' has been exposed by exposing head 210' to define the exposed and non-exposed areas 222' and 220', respectively, controller 22' may energize drives 24' and 26' to retract head 200' so that the workpiece 20' may be removed from engraving bed 12' so that the workpiece 20' may be etched using conventional etching techniques, such as chemical etching.

Once the resist 214' has been exposed, the workpiece 20' may be etched in a manner conventionally known, such as chemically. Thereafter, the unexposed resist in the non-exposed areas 220' may be removed.

Once the workpiece 20' has been exposed and subsequently etched, either the same workpiece or another workpiece (not shown) may be mounted on engraving bed 12' between headstock 16' and tailstock 18' such that the second head 202' may effect engraving either surface 20a' of the workpiece 20' or of a second surface of the other workpiece (not shown) mounted on the bed 12'. Once the desired workpiece is mounted on engraving bed 12', engraving may commence using the engraving device 202'.

Various other features described earlier herein (such as the image system 162, intermeshing patterns and the like) may also be utilized with the exposing and engraving features described herein.

Thus, it should be appreciated that engraving system 10' provides means and apparatus for etching and engraving one or more workpieces. In the embodiment being described, the workpiece may comprise a conventional copper-plated cylinder, a flexographic plate (not shown) which is mounted on a cylinder 20' or a flexographic roll (not shown). Alternatively, the workpiece may also comprise an offset plate (not shown). It should also be appreciated that the engraving system may perform both etching and engraving on a single workpiece or it may perform such operations on separate workpieces as desired. Moreover, the order in which the etching or engraving operations are performed is not critical to achieve the features of the invention. Thus, a user may wish to first engrave a workpiece and then etch the workpiece or vice versa.

In the embodiment being described, it is preferred that the exposed areas 222' define linework images or portions of an image, while the engraved pattern, such as pattern 224' in FIG. 8 defines a continuous tone image or a continuous tone portion of an image. This facilitates providing high definition for linework and accurate density representation for continuous tone images. Thus, for example, if an image comprises both linework and continuous tone portions, the continuous tone portions may be conventionally engraved to provide high quality density representation, while linework portions may be etched, which greatly improves edge definition and line smoothness.

While the embodiments shown in FIGS. 8 and 9 illustrate use of the exposing device 200' in combination with an electro-mechanical engraving devices 202', it should be appreciated that other means for engraving workpiece 20' may be utilized. For example, FIG. 10 illustrates the features of the invention being utilized in combination with a conventional laser engraving head 209' which may include features of the engraving heads currently used on the Laser-Star™ engraver available from MDC Max Dätwyler AG, Flugpatz CH-3368, Bleienbach, Switzerland, or features from laser systems available from Zed Instruments Ltd. of Surrey, England. Thus, it should be appreciated that the engraving device, such as a stylus head or even a laser device, may be utilized in combination with the exposing device 200'. It is also envisioned that a single laser exposing head 200' may also be utilized to perform the laser engraving function described earlier herein, thereby enabling a single laser engraving system to perform both engraving of a workpiece, as well as exposing resist on a workpiece.

As with embodiments described earlier herein, it should be appreciated that the exposing device 200' and engraving device 202' may be situated, as illustrated in FIGS. 8–10, about 180° apart and on a common carriage. Alternatively, the devices 200' and 202' may be situated side-by-side, on the same side of the engraver. In this regard, features of U.S. Pat. No. 5,492,057 which is assigned to the same Assignee as the present invention which is incorporated herein by reference and made a part hereof, may be utilized for positioning the devices 200' and 202' as desired.

Figure 11:
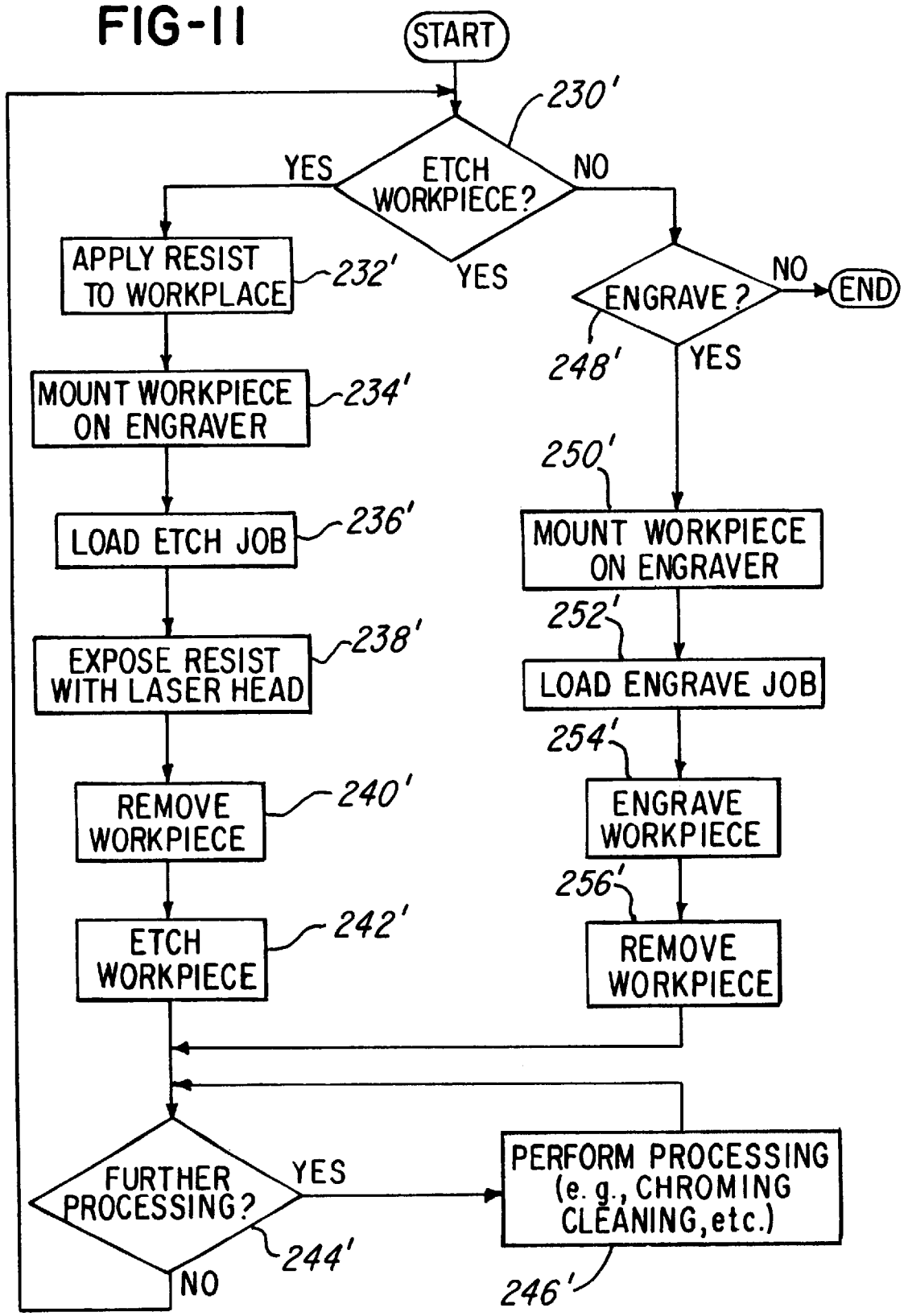
FIG. 11 is a general flow chart of a method for exposing, etching and engraving of one or more workpieces.

A method for etching and engraving in accordance with one embodiment of the invention will now be described relative to FIG. 11. The method begins at decision block 230' where it is determined if it is desired to etch a surface of a workpiece, such as surface 20a' of workpiece 20' in FIG. 8. If it is, then the routine proceeds to block 232' where resist 214' is applied to surface 20a' of workpiece 20' in a conventional manner. At block 234', the workpiece 20a' is mounted on engraving bed 12' between headstock 16' and tailstock 18' as shown.

At block 236', controller 22' downloads an etch job from memory (not shown) or the etch job is input by a user in a conventional manner. At block 238', controller 22' energizes exposing head 200' in response to the etch job and exposes the resist 214' to define the exposed areas 222' and non-exposed areas 220'. After the resist 214' on workpiece 20' is exposed as desired, the workpiece 20' is removed (block 240') from bed 12' and, for example, placed in a vat (not shown) of etching chemicals in order to effect etching (block 242').

At decision block 244', it is determined whether the workpiece 20' requires further processing, and if it does, then the routine proceeds to block 246' where further processing steps are performed, such as removing excess resist, chroming, and the like. Thereafter, the routine proceeds back to decision block 244' as shown. If the decision at decision block 244' is negative, then the routine proceeds back to decision block 230' as shown.

If the decision at decision block 230' is negative, then it is determined at decision block 248' whether it is desired to engrave surface 20' of the workpiece 20' (block 248'). If it is not, then the routine ends.

However, if engraving is desired, then the routine proceeds to block 250' where the workpiece 20' is mounted on engraving bed 12' between headstock 16' and tailstock 18'. At block 252', controller 22' downloads an engraving job from memory (not shown) or the user inputs the engraving job in a manner conventionally known. At block 254', controller 22' energizes engraving device 202' to engrave a surface, such as surface 20a' of workpiece 20' to effect engraving the pattern 224'. Once engraving is complete, the workpiece is removed from bed 12' (block 256'), and the routine then proceeds to decision block 244' as shown.

As alluded to earlier herein, while the exposing process was described and illustrated as being performed first, a user may elect to engrave a workpiece first and subsequently etch either the same workpiece or a different workpiece as desired. This engraving and etching system provides a single multi-purpose system, method and means for both engraving and etching either a single workpiece or multiple workpieces, so that a user may engrave one workpiece and etch another or engrave and etch the same workpiece.

While this apparatus has been shown and described having a pair of engraving heads 34 and 36 (FIG. 1) or an exposing head 200' (FIG. 8) and engraving head 202', it should be appreciated that multiple carriages and sub-carriages having multiple engraving and/or exposing heads may be slidably mounted on engraving bed 12. This would further facilitate engraving a blended, joined and/or inter-meshed pattern, as well as simultaneously exposing multiple areas of resist using multiple exposing heads (not shown). This invention is not limited to engraving symmetrical patterns of the type shown in FIGS. 6A–6C and 7, but could be used to engrave any pattern having a plurality of areas engraved by two or more engraving or exposing devices. Also, it should be appreciated that this invention facilitates over-engraving or overlapping cells engraved by one head with those of another head.

Moreover, it is possible to engrave and etch the same workpiece substantially simultaneously by, for example, situating the etch and engrave heads adjacent to each other to effect exposing resist operatively associated with the exposing head and which is situated on only a portion of the workpiece with the engrave head while engraving another portion of the same workpiece which does not have the resist situated thereon. Alternatively, the engraver head 202' (FIG. 8) or 206' (FIG. 9), for example, can engrave workpiece 20' with or without resist.

As alluded to earlier herein, the multi-purpose engraving system is capable of electro-mechanical engraving, laser engraving and laser exposing, either alone or simultaneously. Thus, as shown and described below relative to FIG. 12, various combinations (such as laser engraving and laser exposing, laser engraving and electro-mechanical engraving, laser exposing and electro-mechanical engraving) may be performed.

Figure 12:
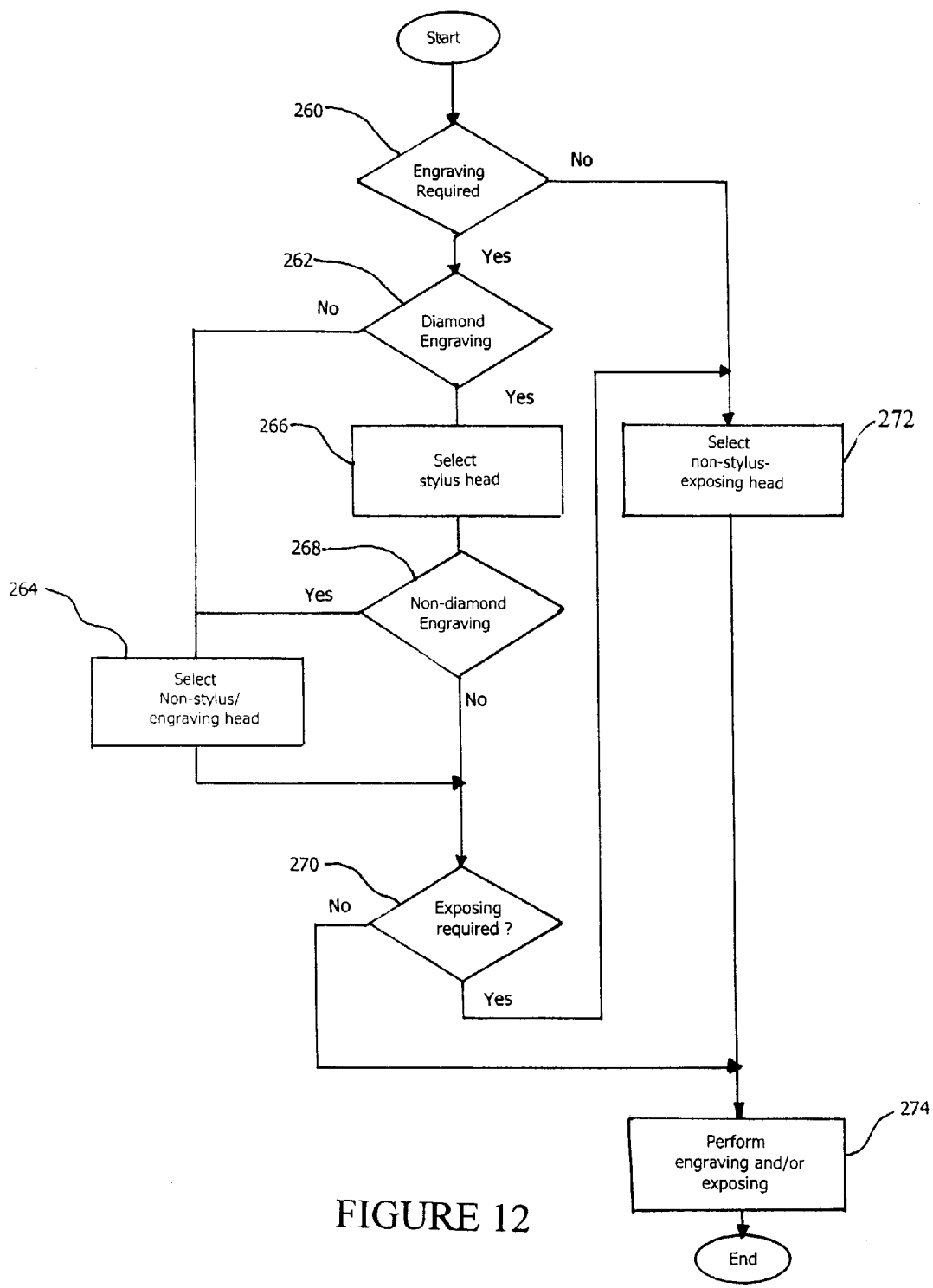
FIG. 12 is a general flow chart of a method for selecting exposing, laser engraving and/or electro-mechanical engraving.

A means, method, process and procedure for selecting among laser exposing, laser engraving and/or electro-mechanical engraving will now be described relative to FIG. 12. The routine begins at decision block 260 where it is determined if engraving is desired or required. If it is not, the routine proceeds to block 272 where controller 22 selects the non-stylus/exposing head, such as head 200' in FIG. 8.

If the decision at decision block 260 is yes, then the routine proceeds to decision block 262 where it is determined if diamond or electro-mechanical engraving is desired. If it is, then the routine proceeds to block 266 where the electro-mechanical or stylus engraving head, such as engraving head 202' (FIG. 8) or 206' (FIG. 9), is selected (block 266). The routine proceeds to decision block 268 where it is determined if a non-diamond engraving, such as a laser-engraving head 209' (FIG. 10) is desired. If it is or if the decision at decision block 262 is negative, then the routine proceeds to block 264 where a non-stylus engraving head, such as the laser engraving head shown in FIG. 10 is selected.

If the decision at decision block 268 is negative or after selecting the non-stylus engraving head at block 264, the routine proceeds to decision block 270 where it is ascertained whether exposing is desired or required (block 270). If it is, then the routine proceeds to block 272 described earlier herein wherein a non-stylus/exposing head is selected.

If the decision at decision block 270 is negative or following the selection at block 272, the routine proceeds to block 272 where the operations of engraving and/or exposing as described earlier herein are performed. Thereafter, the routine terminates.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An engraving system for engraving at least one workpiece comprising:

an engraving bed having a non-stylus head and a stylus head mounted thereon; and a controller coupled to said non-stylus head and said stylus head for independently and selectively energizing each of said non-stylus head and said stylus head to facilitate engraving in accordance with a first engraving technique and a second engraving technique, respectively.

2. The engraving system as recited in claim 1 wherein a surface of said at least one workpiece comprises a resist, said non-stylus head comprising an exposing head for exposing a portion of said resist to facilitate etching said surface.

3. The engraving system as recited in claim 2 wherein said exposing head comprises a laser.

4. The engraving system as recited in claim 3 wherein said exposed pattern defines a linework portion of an image and said engraved pattern defines a continuous tone portion of said image.

5. The engraving system as recited in claim 1 wherein said non-stylus head exposes resist on a surface of said at least one workpiece to define an exposed pattern and said stylus head engraves an engraved pattern into either the same surface or a second surface of a second workpiece.

6. The engraving system as recited in claim 5 wherein said engraved pattern defines a continuous tone portion of an image.

7. The engraving system as recited in claim 5 wherein said exposed pattern defines a linework portion of an image.

8. The engraving system as recited in claim 1 wherein said non-stylus head and stylus head are angularly displaced about 180 degrees apart.

9. The engraving system as recited in claim 1 wherein said non-stylus head and stylus head are situated side-by-side and on the same side of said engraver.

10. The engraving system as recited in claim 1 wherein said stylus head comprises:

a magnetostrictive member coupled to a stylus.

11. The engraving system as recited in claim 10 wherein the magnetostrictive member comprises $Tb_xDy_{1-x}Fe2$.

12. The engraving system as recited in claim 1 wherein said non-stylus head comprises a laser engraver.

13. The engraving system as recited in claim 12 wherein said stylus head comprises an electro-mechanical engraving head.

14. The engraving system as recited in claim 1 wherein said stylus head comprises an electro-mechanical engraving head.

15. The engraving system as recited in claim 14 wherein said electro-mechanical engraving head comprises a piezo-electric engraving head.

16. The engraving system as recited in claim 1 wherein said workpiece is either a workpiece or plate mounted on a cylinder, said cylinder or plate comprising a resist capable of being exposed by said non-stylus head.

17. The engraving system as recited in claim 1 wherein said workpiece comprises a flexographic plate or roll.

18. The engraving system as recited in claim 17 wherein said second engraving technique comprises laser engraving.

19. The engraving system as recited in claim 1 wherein said first engraving technique comprises exposing.

20. The engraving system as recited in claim 19 wherein said second engraving technique comprises electro-mechanical engraving.

21. The engraving system as recited in claim 1 wherein said workpiece comprises an offset plate.

22. The engraving system as recited in claim 1 wherein said first engraving technique comprises laser exposing.

23. A method for engraving at least one workpiece comprising the steps of:
providing an engraver having a first head to facilitate engraving in accordance with one engraving technique and a second head to facilitate engraving in accordance with a second engraving technique;
selectively controlling the operation of said first head and second head to selective switch between said first and second engraving techniques.

24. The method as recited in claim 23 wherein said method further comprises the step of:
exposing resist to perform a portion of said first engraving technique.

25. The method as recited in claim 24 wherein said second engraving technique comprises electromechanical engraving using an electro-mechanical engraving head.

26. The method as recited in claim 24 wherein said first engraving technique is laser exposing.

27. The method as recited in claim 23 wherein said second engraving technique comprises electromechanical engraving using an electro-mechanical engraving head.

28. The method as recited in claim 23 wherein said method further comprises the step of:
exposing resist using a laser to perform said first engraving technique.

29. The method as recited in claim 28 wherein said second engraving technique comprises electromechanical engraving using an electro-mechanical engraving head.

30. The method as recited in claim 23 wherein said method further comprises the step of:
providing said non-stylus engraving head comprising a laser for exposing resist on a surface of a workpiece to be engraved.

31. The method as recited in claim 30 wherein said method further comprises the step of:
providing said second head comprising an electro-mechanical engraving head.

32. The method as recited in claim 23 wherein said method further comprises the step of:
providing said second head comprising an electro-mechanical engraving head.

33. The method as recited in claim 23 wherein said method further comprises the step of:
providing said first head comprising a laser engraver for engraving a surface of a workpiece to be engraved.

34. The method as recited in claim 23 wherein said providing step comprises the step of:
providing first and second heads which are integral and which use a common laser.

35. A method for engraving comprising the steps of:
rotatably mounting the workpiece on an engraver;
exposing resist situated on a workpiece to provide an exposed pattern using a laser mounted on said engraver;
removing said workpiece from said engraver;
etching said exposed workpiece to provide said etched area;
mounting either the same workpiece or a second workpiece onto said engraver; and
engraving said same workpiece or said second workpiece using an engraving head mounted on said engraver.

36. The method as recited in claim 35 wherein said method further comprising the step of:
performing said engraving step before said etching step.

37. The method as recited in claim 35 wherein said method further comprises the step of:
performing said engraving step using an electro-mechanical engraving head.

38. The method as recited in claim 37 wherein said performing step further comprises the step of:
using a piezo-electric engraving head.

39. The method as recited in claim 35 wherein said method further comprises the step of:
performing said engraving step using a laser engraving head.

40. The method as recited in claim 35 wherein said method further comprises the step of:
performing said engraving step using a magnetostrictive engraving head.

41. The method as recited in claim 35 wherein said workpiece is either a gravure cylinder or flexographic roll.

42. The method as recited in claim 35 wherein said workpiece comprises a plate.

43. An engraver comprising:
an engraving bed;
an engraving head mounted on said engraving bed for engraving at least one workpiece;
a second head mounted on said engraving bed for exposing resist on either said at least one workpiece or on a second workpiece;
a controller coupled to said second head and said engraving head for energizing said second head to expose resist situated on said at least one workpiece and/or said second workpiece and also for energizing said engraving head to engrave said at least one workpiece and/or said second workpiece.

44. The engraver as recited in claim 43 wherein said second head comprises a laser.

45. The engraver as recited in claim 44 wherein said engraving head comprises a laser.

46. The engraver as recited in claim 44 wherein said engraving head comprises an electro-mechanical engraving head.

47. The engraver as recited in claim 43 wherein second head exposes said resist to provide an exposed area defining a linework image.

48. The engraver as recited in claim 47 wherein said engraving head engraves said workpiece to define a continuous tone image.

49. The engraver as recited in claim 43 wherein said engraving head comprises a laser engraving head.

50. The engraver as recited in claim 43 wherein said engraving head comprises a magnetostrictive engraving head.

51. The engraver as recited in claim 43 wherein said engraving head engraves said workpiece to define an engraved area defining a continuous tone image.

52. The engraver as recited in claim 43 wherein said engraving head comprises an electro-mechanical engraving head.

53. The engraver as recited in claim 43 wherein said engraving head and said second head use a common laser for effecting engraving and exposing, respectively.

54. A method for engraving comprising the steps of:
rotatably mounting a workpiece on an engraver;
engraving said workpiece with an engraved pattern;
removing said workpiece from said engraver;
coating at least a portion of said workpiece with a resist;
remounting said workpiece on said engraver;
exposing said resist using said engraver to provide an exposed pattern using a laser mounted on said engraver;
removing said workpiece from said engraver; and
etching said exposed workpiece to provide an etched pattern such that said workpiece comprises both said etched and engraved patterns.

55. The method as recited in claim 54 wherein said method further comprises the step of:
performing said engraving step using an electro-mechanical engraving head.

56. The method as recited in claim 55 wherein said performing step further comprises the step of:
using a piezo-electric engraving head.

57. The method as recited in claim 54 wherein said method further comprises the step of:
performing said engraving step using a laser engraving head.

58. The method as recited in claim 54 wherein said method further comprises the step of:
performing said engraving step using a magnetostrictive engraving head.

59. The method as recited in claim 54 wherein said workpiece is either a gravure cylinder or flexographic roll.

60. The method as recited in claim 54 wherein said workpiece comprises a plate.

61. A multi-purpose engraving system for engraving a at least one workpiece using a plurality of engraving techniques comprising:
a controller for controlling the operation of the engraver;
means coupled to said controller for engraving said at least one workpiece to provide an engraved pattern and also for exposing resist on either said workpiece or a second workpiece to define a resist pattern in response to said controller.

62. The engraving system as recited in claim 61 wherein said means comprises:
a first head for exposing said resist and a second head for effecting engraving.

63. The engraving system as recited in claim 62 wherein said second head comprises:
a magnetostrictive member coupled to a stylus.

64. The engraving system as recited in claim 63 wherein the magnetostrictive member comprises $Tb_xDy_{1-x}Fe2$.

65. The engraving system as recited in claim 62 wherein said second head comprises a laser engraver.

66. The engraving system as recited in claim 62 wherein said second head comprises an electro-mechanical engraving head.

67. The engraving system as recited in claim 66 wherein said electro-mechanical engraving head comprises a piezo-electric engraving head.

68. The engraving system as recited in claim 62 wherein said first and second heads are angularly displaced about 180 degrees apart.

69. The engraving system as recited in claim 62 wherein said first and second heads are situated side-by-side and on the same side of said engraver.

70. The engraving system as recited in claim 62 wherein said first head comprises a laser.

71. The engraving system as recited in claim 61 wherein said means comprises:
a single head for effecting both exposing and engraving.

72. The engraving system as recited in claim 71 wherein said single head comprises a laser.

73. The engraving system as recited in claim 61 wherein said means comprises an exposing head for exposing a portion of said resist to facilitate etching a surface.

74. The engraving system as recited in claim 73 wherein said exposing head comprises a laser.

75. The engraving system as recited in claim 61 wherein said resist pattern defines a linework portion of an image.

76. The engraving system as recited in claim 61 wherein said engraved pattern defines a continuous tone portion of an image.

77. The engraving system as recited in claim 61 wherein said resist pattern defines a linework portion of an image and said engraved pattern defines a continuous tone portion of said image.

78. The engraving system as recited in claim 61 wherein said workpiece is either a cylinder or a plate mounted on a cylinder, said cylinder or plate comprising a resist capable of being exposed by said first head.

79. The engraving system as recited in claim 61 wherein said workpiece comprises a flexographic plate or roll.

80. The engraving system as recited in claim 61 wherein said workpiece comprises an offset plate.

* * * * *